(12) United States Patent  
Suzuki

(10) Patent No.: US 12,534,201 B2
(45) Date of Patent: Jan. 27, 2026

(54) MOVING BODY

(71) Applicant: AERONEXT INC., Tokyo (JP)

(72) Inventor: Yoichi Suzuki, Tokyo (JP)

(73) Assignee: AERONEXT INC., Tokyo (JP)

( * ) Notice: Subject to any disclaimer, the term of this patent is extended or adjusted under 35 U.S.C. 154(b) by 0 days.

(21) Appl. No.: 18/982,820

(22) Filed: Dec. 16, 2024

(65) Prior Publication Data

US 2025/0115354 A1 Apr. 10, 2025

Related U.S. Application Data

(62) Division of application No. 17/795,213, filed as application No. PCT/JP2020/030536 on Aug. 11, 2020, now Pat. No. 12,208,897.

(51) Int. Cl.
*B64D 1/22* (2006.01)
*B64C 39/02* (2023.01)
(Continued)

(52) U.S. Cl.
CPC ............. *B64D 1/22* (2013.01); *B64C 39/024* (2013.01); *B64U 10/13* (2023.01); *B64U 30/20* (2023.01); *B64U 2101/60* (2023.01)

(58) Field of Classification Search
CPC ........ B64D 1/22; B64D 9/003; B64C 39/024; B64U 10/13; B64U 30/20; B64U 2101/60; B64U 40/20; B64U 2101/64
See application file for complete search history.

(56) References Cited

U.S. PATENT DOCUMENTS 11,649,049 B2 * 5/2023 Green ................... B64U 10/17
244/17.23
11,805,930 B2 * 11/2023 Ritchie .............. A47G 29/1214
(Continued)

FOREIGN PATENT DOCUMENTS

JP 51-19481 U 7/1949
JP 2529661 Y2 3/1997
(Continued)

OTHER PUBLICATIONS

European search report dated Apr. 11, 2024 for European patent application No. 20949490.5.
(Continued)

*Primary Examiner* — Medhat Badawi
(74) *Attorney, Agent, or Firm* — HAUPTMAN HAM, LLP

(57) ABSTRACT

A moving body that can be transported in a state to stabilize the posture of the transport object, without affecting the transport object due to the inclination of the moving body when moving forward. A moving body comprising a holding mechanism that has a rotation unit that rotates in the pitch direction, and approximately horizontally holds an object to be transported from the side near the center of gravity of a transport unit capable of storage or above the center of gravity. Further, a moving body wherein the holding mechanism has a uniaxial rotation unit that rotates only in the pitch direction. Further, a moving body wherein the holding mechanism approximately horizontally holds the transport unit by active control. Alternatively, the holding mechanism approximately horizontally holds the transport unit by passive control.

6 Claims, 27 Drawing Sheets

(51) Int. Cl.
   *B64U 10/13*      (2023.01)
   *B64U 30/20*      (2023.01)
   *B64U 101/60*     (2023.01)

(56) References Cited

U.S. PATENT DOCUMENTS

| | | | | |
|---|---|---|---|---|
| 11,926,417 | B2* | 3/2024 | Suzuki | B64D 1/22 |
| 12,208,897 | B2* | 1/2025 | Suzuki | B64U 40/20 |
| 2007/0012818 | A1* | 1/2007 | Miyazawa | B64U 30/24 244/17.25 |
| 2011/0084162 | A1* | 4/2011 | Goossen | B64U 70/80 244/135 C |
| 2011/0290937 | A1* | 12/2011 | Salkeld | G05D 1/0094 348/E7.085 |
| 2015/0175276 | A1* | 6/2015 | Koster | A47G 29/14 244/114 R |
| 2016/0337562 | A1* | 11/2016 | Kang | H04N 7/183 |
| 2018/0141647 | A1* | 5/2018 | Suzuki | B64U 50/13 |
| 2019/0066984 | A1* | 2/2019 | Mungekar | H05B 1/0233 |
| 2019/0127052 | A1* | 5/2019 | Chen | B64C 25/12 |
| 2019/0202560 | A1* | 7/2019 | Bosworth | B64U 50/19 |
| 2019/0276140 | A1* | 9/2019 | Poltorak | B64U 50/19 |
| 2020/0094959 | A1* | 3/2020 | Suzuki | B64U 50/19 |
| 2020/0164966 | A1* | 5/2020 | Suzuki | B64U 50/19 |
| 2020/0277055 | A1* | 9/2020 | Suzuki | B64U 10/14 |
| 2020/0331603 | A1* | 10/2020 | Green | B64U 10/17 |
| 2020/0354047 | A1* | 11/2020 | Suzuki | B64U 10/13 |
| 2020/0391863 | A1* | 12/2020 | Suzuki | B64U 40/20 |
| 2021/0214098 | A1* | 7/2021 | Suzuki | H04N 23/90 |
| 2021/0276712 | A1* | 9/2021 | Suzuki | B64D 47/00 |
| 2021/0291978 | A1* | 9/2021 | Suzuki | B64C 25/08 |
| 2021/0291981 | A1* | 9/2021 | Suzuki | B64U 60/50 |
| 2021/0354811 | A1* | 11/2021 | Suzuki | B64U 30/10 |
| 2021/0387743 | A1* | 12/2021 | Suzuki | B64U 20/87 |
| 2022/0063800 | A1* | 3/2022 | Suzuki | B64C 29/02 |
| 2022/0274701 | A1* | 9/2022 | Suzuki | B64C 39/08 |
| 2022/0274706 | A1* | 9/2022 | Suzuki | B64C 37/02 |
| 2022/0297834 | A1* | 9/2022 | Suzuki | B64U 30/12 |
| 2022/0332414 | A1* | 10/2022 | Yamato | B64D 45/00 |
| 2022/0350330 | A1* | 11/2022 | Wang | G06F 3/012 |
| 2023/0013275 | A1* | 1/2023 | Suzuki | B64U 10/10 |
| 2023/0033507 | A1* | 2/2023 | Suzuki | B64U 10/16 |
| 2023/0049474 | A1* | 2/2023 | Suzuki | B64D 1/22 |
| 2023/0056709 | A1* | 2/2023 | Suzuki | B64U 10/14 |
| 2023/0069643 | A1* | 3/2023 | Suzuki | B64D 1/20 |
| 2023/0202686 | A1* | 6/2023 | Suzuki | B64U 10/13 244/6 |
| 2023/0202687 | A1* | 6/2023 | Suzuki | B64U 10/13 244/17.23 |
| 2023/0331407 | A1* | 10/2023 | Suzuki | B64U 10/14 |
| 2023/0415892 | A1* | 12/2023 | Suzuki | B64D 9/003 |
| 2024/0025574 | A1* | 1/2024 | Suzuki | B64U 30/299 |
| 2024/0025576 | A1* | 1/2024 | Suzuki | B64C 39/02 |
| 2024/0029574 | A1* | 1/2024 | Suzuki | B64C 39/02 |
| 2024/0067329 | A1* | 2/2024 | Suzuki | B64U 30/297 |
| 2025/0115354 | A1* | 4/2025 | Suzuki | B64C 39/024 |

FOREIGN PATENT DOCUMENTS

| | | |
|---|---|---|
| JP | 10-35816 A | 2/1998 |
| JP | 2005047369 A | 2/2005 |
| JP | 2007203872 A | 8/2007 |
| JP | 2015117003 A | 6/2015 |
| JP | 2017171291 A | 9/2017 |
| JP | 2020089941 A | 6/2020 |
| JP | 2020524106 A | 8/2020 |
| WO | 2017188041 A1 | 11/2017 |
| WO | 2020136803 A1 | 7/2020 |

OTHER PUBLICATIONS

Notice of reasons for refusal dated Jul. 1, 2021 issued for Japanese Patent Application No. 2020-559009.

Notice of reasons for refusal mailed Aug. 24, 2023 for Japanese Patent application 2021-151756.

* cited by examiner

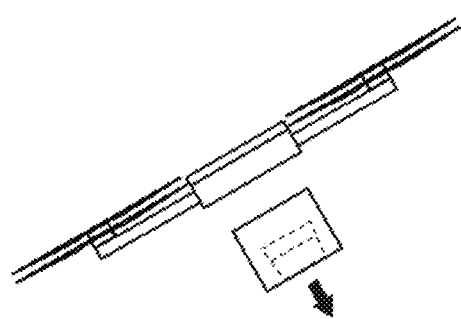
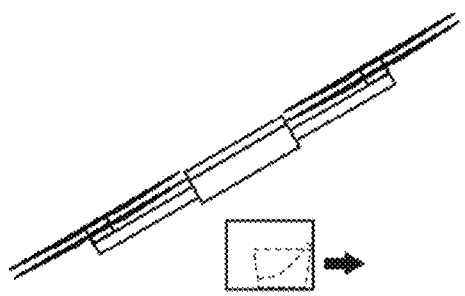
FIG. 16A  FIG. 16B
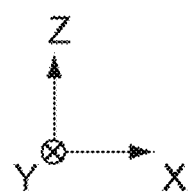

MOVING BODY

CROSS REFERENCE TO RELATED APPLICATIONS

This application is a divisional application of Ser. No. 17/795,213, filed Jul. 25, 2022, which is a national phase entry of International Application No. PCT/JP2020/030536 filed Aug. 11, 2020, which are incorporated by reference in their entirety.

TECHNICAL FIELD

The present invention relates to a moving body.

BACKGROUND ART

In recent years, research and demonstration experiments have been conducted for the practical application of services using an aircraft such as a drone or an unmanned aerial vehicle (UAV) (hereinafter collectively referred to as "aircraft"). In view of such a situation, Patent Literature 1 discloses a flight vehicle capable of gripping a transport object (see, for example, Patent Literature 1).

Patent Literature 1 provides a gripping mechanism and a transport object conveyance device capable of stably gripping transport objects of various sizes (see, for example, Patent Literature 1).

PRIOR ART LIST

Patent Literature

[Patent Literature 1] Japanese Unexamined Patent Publication No. 2020-089941

SUMMARY OF THE INVENTION

Technical Problem

In Patent Literature 1, it is possible to provide a gripping mechanism capable of stably gripping and transporting transport objects of various sizes by attaching them to a flight vehicle.

However, in the gripping mechanism of Patent Literature 1, the inclination of the transport object due to the movement during flight is not taken into consideration, and the posture of the transport object becomes unstable due to the change in the posture of the flight vehicle during forward movement. It is desirable that the gripping mechanism for the transport object is assumed to have various uses as well as sizes.

Therefore, an object of the present invention is to provide a moving body that can be transported in a state to stabilize the posture of the transport object, without affecting the transport object due to the inclination of the moving body during forward movement.

Technical Solution

According to the present invention, there can be provided a moving body comprising a holding mechanism that has a rotation unit that rotates in the pitch direction, and approximately horizontally holds an object to be transported from the side near the center of gravity of a transport unit capable of storage or above the center of gravity.

Advantageous Effects

According to the present invention, there can be provided a moving body that can transport an object in a stable posture.

BRIEF DESCRIPTION OF THE DRAWINGS

FIGS. 16A and 16B are a front view of a comparison between a case where the flight vehicle 100 according to the present invention is provided with one axis and a case where it is provided with two axes.

DETAILED DESCRIPTION OF THE EMBODIMENTS

Figure 1:
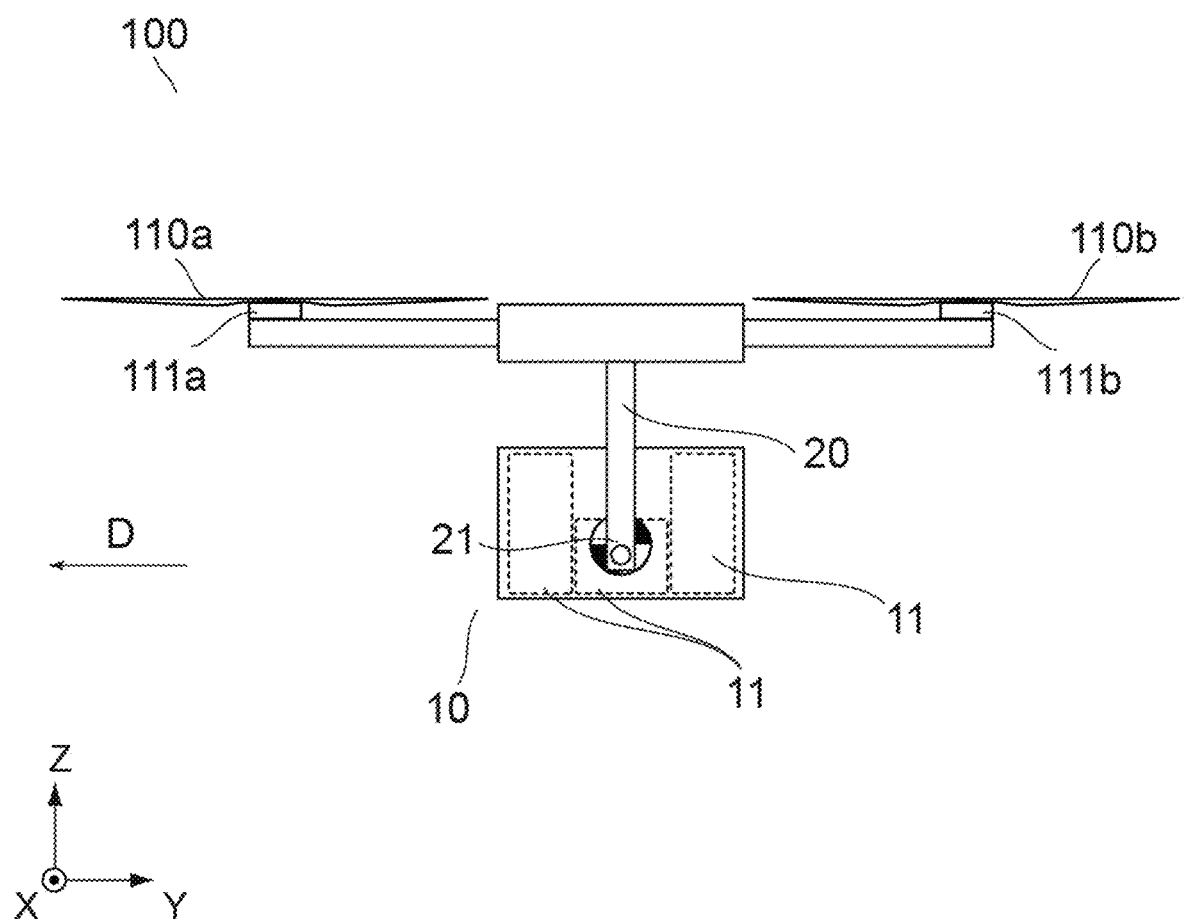
FIG. 1 is a conceptual diagram of the flight vehicle 100 according to the present invention as viewed from the side.

The contents of the embodiments of the present invention will be listed and described. The moving body according to the embodiment of the present invention has the following configuration.

[Item 1]

A moving body comprising a holding mechanism that has a rotation unit that rotates in the pitch direction, and approximately horizontally holds an object to be transported from the side near the center of gravity of a transport unit capable of storage or above the center of gravity.

[Item 2]

The moving body according to Item 1, wherein the holding mechanism has a uniaxial rotation unit that rotates only in the pitch direction.

[Item 3]

The moving body as in Item 1 or 2, wherein the holding mechanism approximately horizontally holds the transport unit by active control.

[Item 4]

The moving body according to Item 3, wherein the holding mechanism holds below the center of the side of the transport unit.

[Item 5]

The moving body as in Item 1 or 2, wherein the holding mechanism appropriately horizontally holds the transport unit by passive control.

[Item 6]

The moving body according to Item 5, wherein the holding mechanism holds the center of the side surface or above the center of the transport unit.

[Item 7]

The moving body according to Item 1, wherein the holding mechanism has a biaxial rotation unit that rotates in the pitch direction and the roll direction.

[Item 8]

The moving body according to Item 7, wherein the biaxial rotation unit is configured such that the rotating shaft in the pitch direction and the rotating shaft in the roll direction do not intersect.

[Item 9]

The moving body according to Item 8, wherein the biaxial rotation unit is configured such that the rotating shaft in the pitch direction is located below the rotating shaft in the roll direction.

[Item 10]

The moving body according to Item 8, wherein the biaxial rotation unit is configured such that the rotating shaft in the pitch direction is located above the rotating shaft in the roll direction.

[Item 11]

The moving body as in any one of Items 1 to 10, wherein the biaxial rotation unit has a separation mechanism or a removal mechanism.

[Item 12]

The moving body as in any one of Items 1 to 11, wherein a main body of the moving body has a movable area for the transport object.

Details of Embodiments According to the Present Invention

Hereinafter, a moving body according to embodiments of the present invention will be described with reference to the accompanying drawings. In the accompanying drawings, the same or similar elements are given the same or similar reference numerals and names, and in the description of each embodiment, the portions overlapped to the same or similar elements may be omitted. In addition, the features shown in each embodiment can be applied to other embodiments as long as they do not contradict each other.

Details of First Embodiment

As shown in FIGS. 1 to 9, the flight vehicle 100 according to an embodiment of the present invention includes a holding mechanism 20 capable of holding in at least two points, so that an object to be transported 11 or a container containing the object to be transported 11 (hereinafter, collectively referred to as a transport unit 10) held in the flight vehicle 100 does not fall unintentionally, wherein the transport unit 10 can be mounted on the airframe and transported to a destination point.

Figure 2:
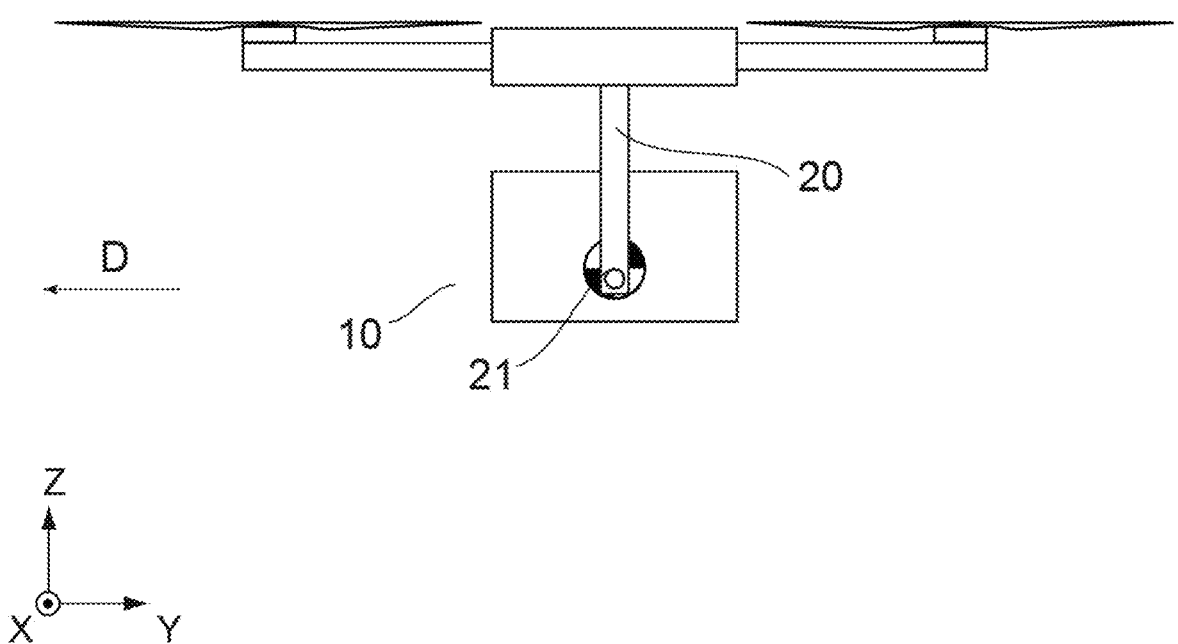
FIG. 2 is another side view of the flight vehicle 100 of FIG. 1.
Figure 3:
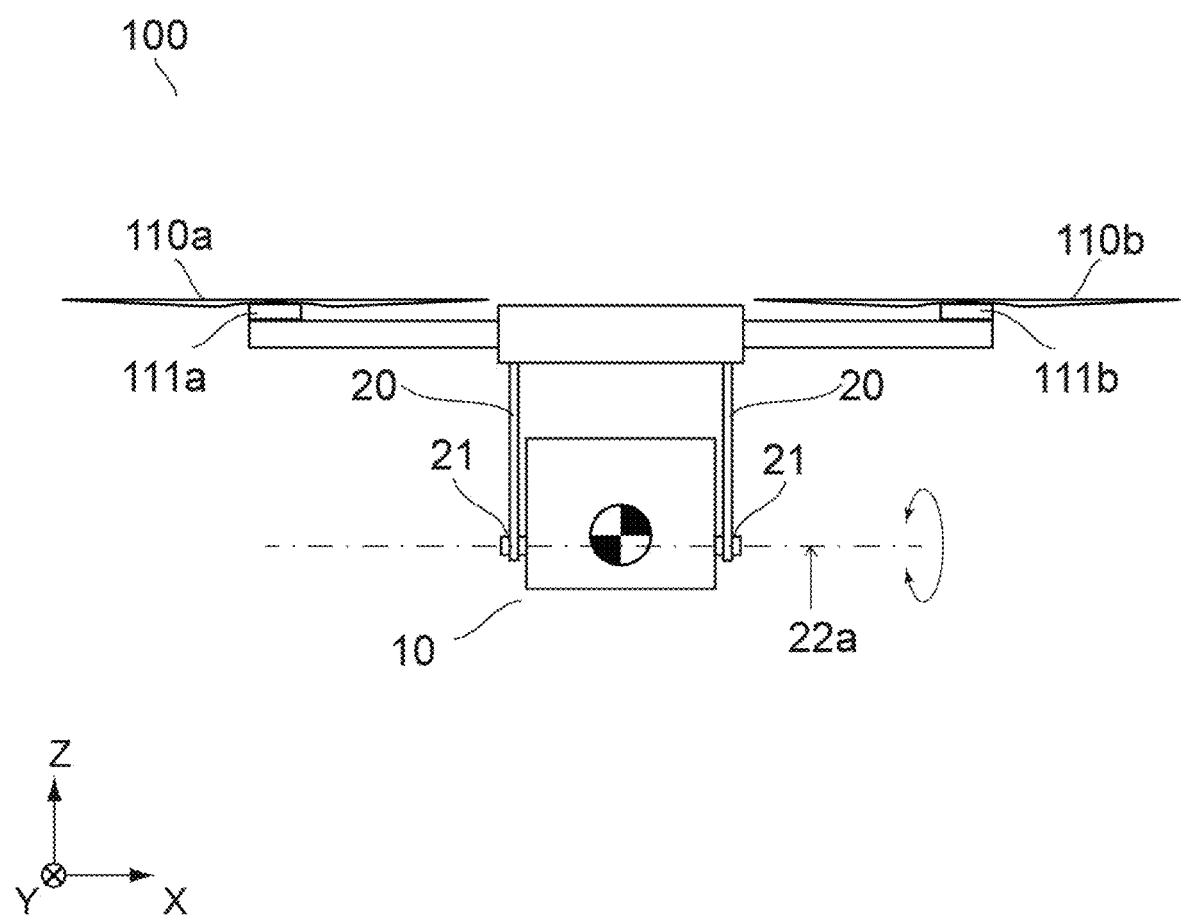
FIG. 3 is a front view of the flight vehicle 100 of FIG. 1.

The holding mechanism 20 includes a rotation unit 21 and a connection unit 23 and is provided so that a part thereof is connected to the flight vehicle 100, and the other part is connected to the side of the transport unit 10 by the connection unit 23 via the rotation unit 21. The holding mechanism 20 having two holding points holds one point on each side facing each other, for example, when the transport unit 10 is a substantially rectangular parallelepiped, and can also hold one vertical side facing each other, for example, so that the transport unit 10 shown in FIGS. 1 to 3 is rotated by 45 degrees in the XY plane.

The holding configuration of the transport unit 10 by the holding mechanism 20 (that is, the configuration of the connection unit 23) includes piercing of needles and fork-shaped protrusions, suction by the magnetic force of permanent magnets and electromagnets, vacuum suction using suction cups and vacuum pads, holding by clamp fasteners, etc., in addition to fixing with screws and metal fittings. The holding mechanism 20 is further provided with a storage place having a bottom surface and a wall surrounding the bottom surface, wherein the transport unit 10 is placed in the storage place, and the wall of the storage place is indirectly held by the above holding method.

It is desirable that the holding mechanism 20 is capable of separating the transport unit 10 from the flight vehicle in a predetermined situation. For example, it may be a mechanism for separating the transport unit 10 from the holding mechanism 20. If the transport unit 10 is a container containing the transport object 11, it may be a mechanism in which at least a part of the container is opened so that the object to be transported 11 can be taken out. These mechanisms are suitable for transporting the object to be transported 11.

As a more specific example, in a pattern in which the entire transport unit 10 needs to be delivered to the transport destination, for example, when the transport unit 10 is a product that is a transport object 11 and a cardboard box containing the product, it is desirable that a separation mechanism for detaching or removing the transport unit 10 attached by the above-mentioned connection method or other known method from the flight vehicle 100 is provided.

As other specific examples, when the transport unit 10 is, for example, a product that is a transport object 11 and a dedicated container that contains the product, the connection unit 23 included in the holding mechanism 20 and the hole part 12 provided in the transport unit 10 are fitted so that the transport unit 10 can be connected so as not to fall unintentionally, as shown in FIGS. 8 to 11. It is desirable that a separation mechanism is provided so that the connection unit 23 included in the holding mechanism 20 can be detached from the hole part 12 included in the transport unit 10. Further, the hole part 12 may have any shape, for example, a point shape or a linear shape extending in the Y-axis direction.

The separation mechanism may be any structure as long as the transport unit 10 can be separated or removed from the flight vehicle 100, and may be a known structure, but for example, the holding mechanism 20 may be a movable mechanical mechanism. More specifically, it may be a configuration in which the pressing force from the side (X-axis direction) of the transport unit 10 is loosened by a slide mechanism having screws, gears, actuators, etc., or a configuration in which energization is stopped to weaken the pressing force or suction force. As another specific example, the connection unit 23 may be removed from the hole part 12 by expanding in the X-axis direction due to the elasticity of the material of the holding mechanism 20 or the like.

In particular, since the holding mechanism 20 includes a separation mechanism capable of remote separation control by electrical control, it is not necessary for a user to approach or touch the airframe in order to receive the transport unit 10 or the object to be transported 11. Thereby, the user who receives the object to be transported 11 can easily and safely use the transportation service by the flight vehicle 100.

Figure 10:
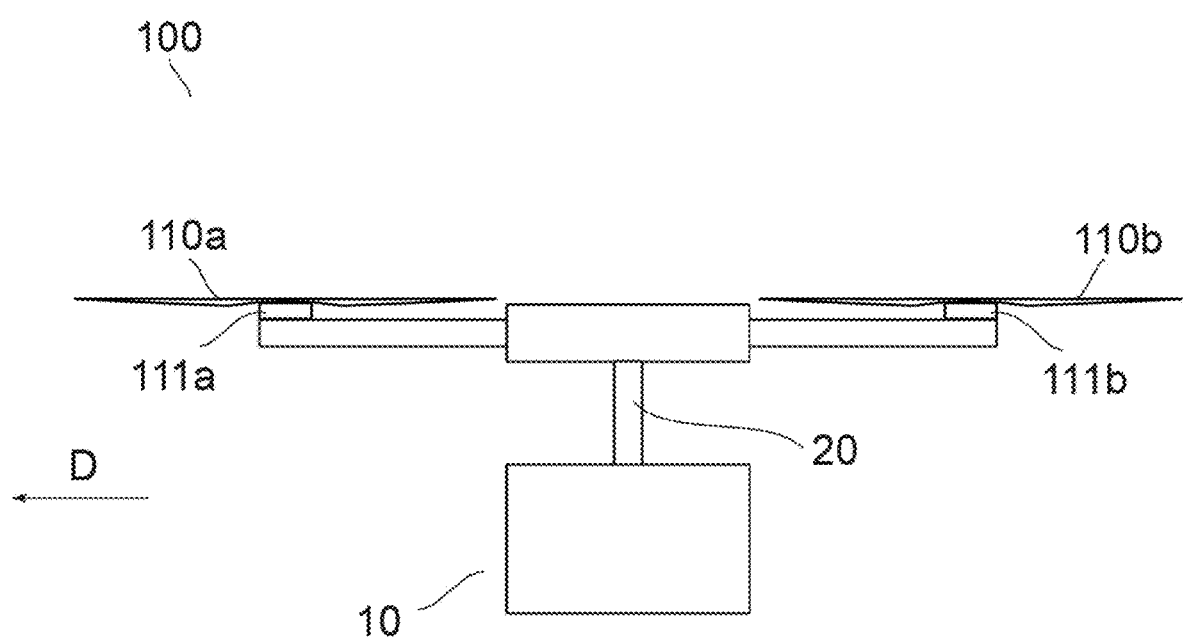
FIG. 10 is a conceptual diagram of a conventional flight vehicle as viewed from the side.
Figure 11:
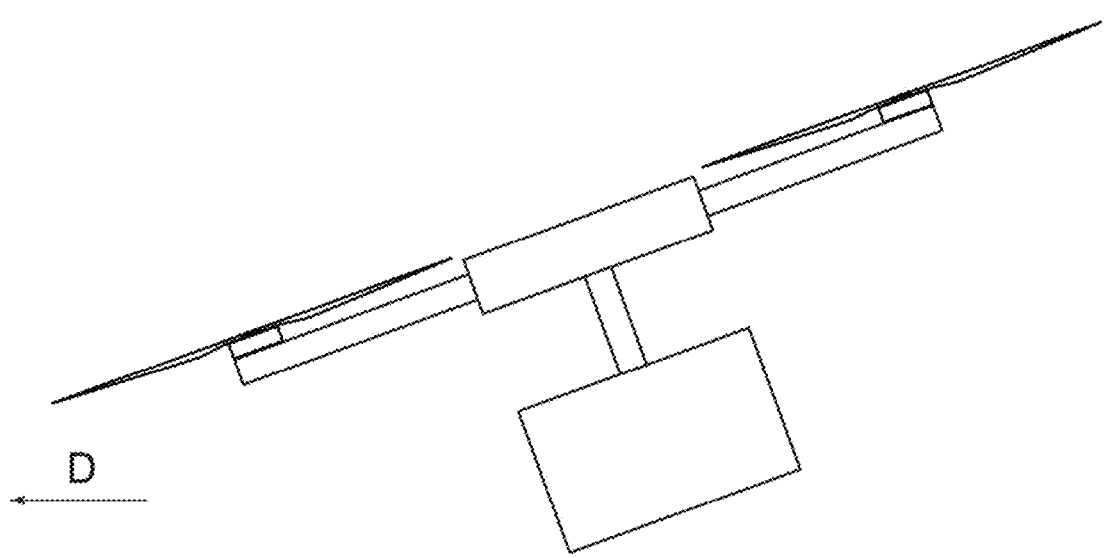
FIG. 11 is a figure of the flight vehicle of FIG. 10 during forward movement.

Here, the transport unit 10 in the conventional flight vehicle will be described. As shown in FIGS. 10 and 11, the flight vehicle 100 having a plurality of rotor blades is tilted as it travels. This tilt is especially noticeable when flying at high speeds.

Therefore, when the transport unit 10 in the conventional flight vehicle includes a material that easily loses its shape or is vulnerable to inclination (for example, food, precision products, liquids that agitation should be avoided, etc.), the user must fly the flight vehicle so that the inclination of the flight vehicle 100 during forward movement does not affect the transport unit 10, making it difficult to fly at high speed.

In addition, as shown in FIG. 11, when the flight vehicle 100 is in the forward posture, there is a concern that the transport unit 10 also increases in the air resistance from the traveling direction by tilting similarly.

Figure 4:
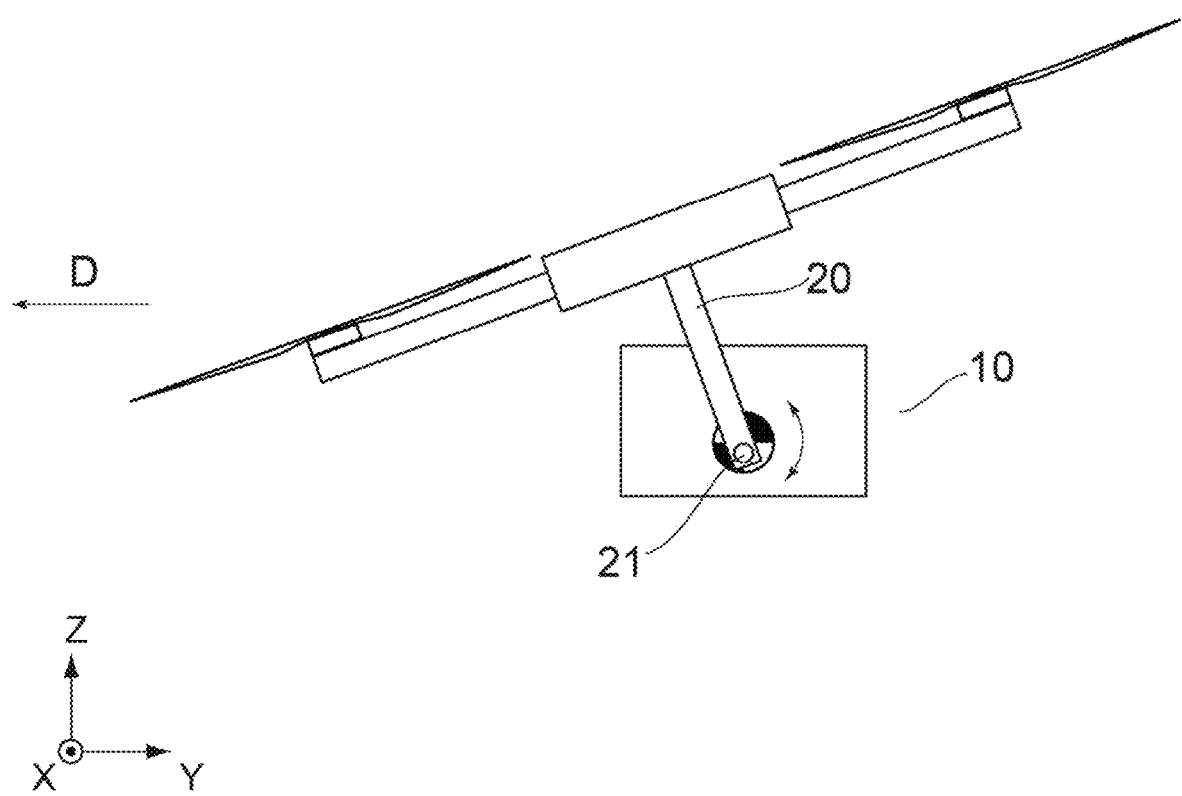
FIG. 4 is a view of the flight vehicle 100 of FIG. 1 during forward movement.
Figure 5:
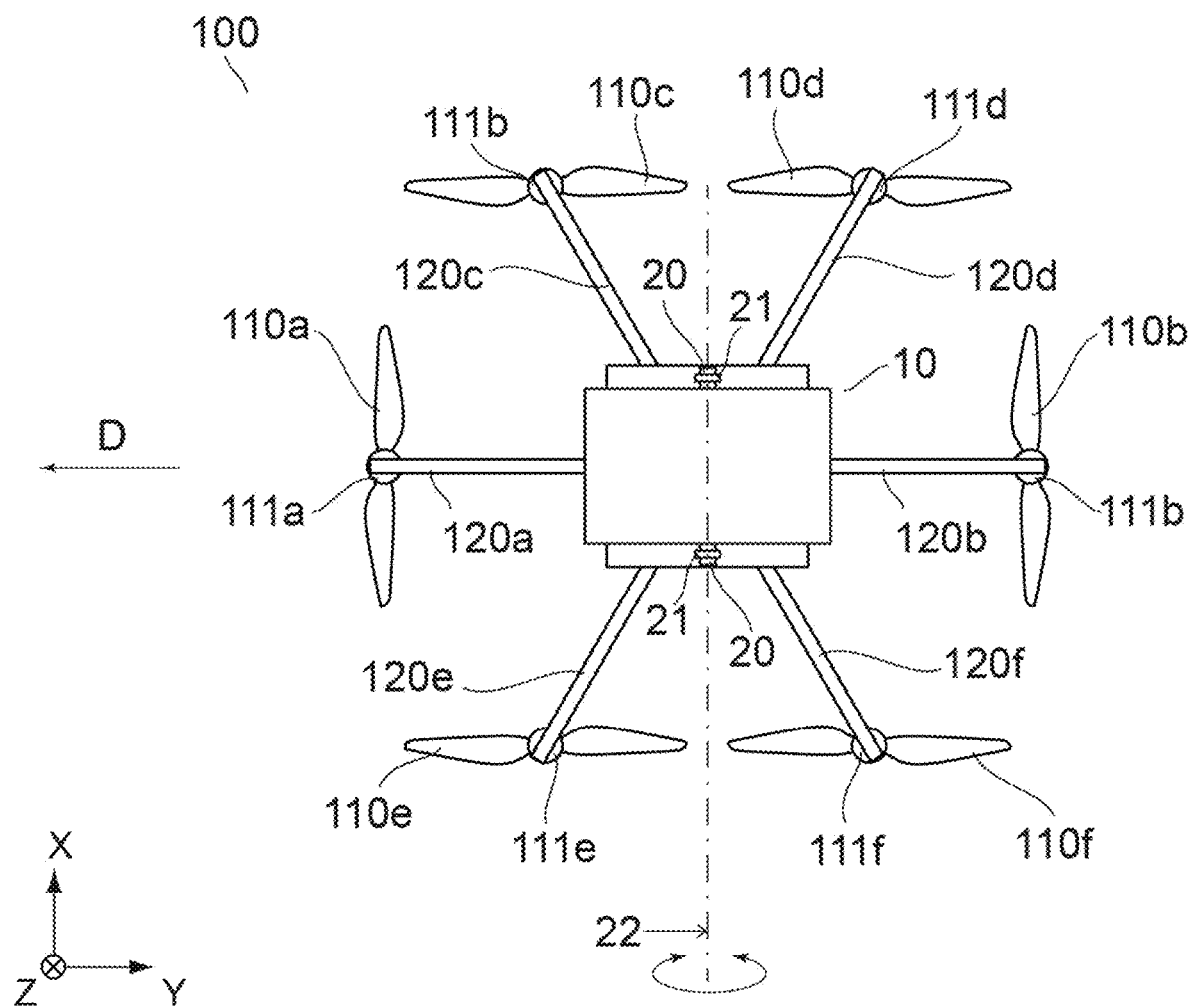
FIG. 5 is a bottom view of the flight vehicle 100 of FIG. 1.
Figure 6:
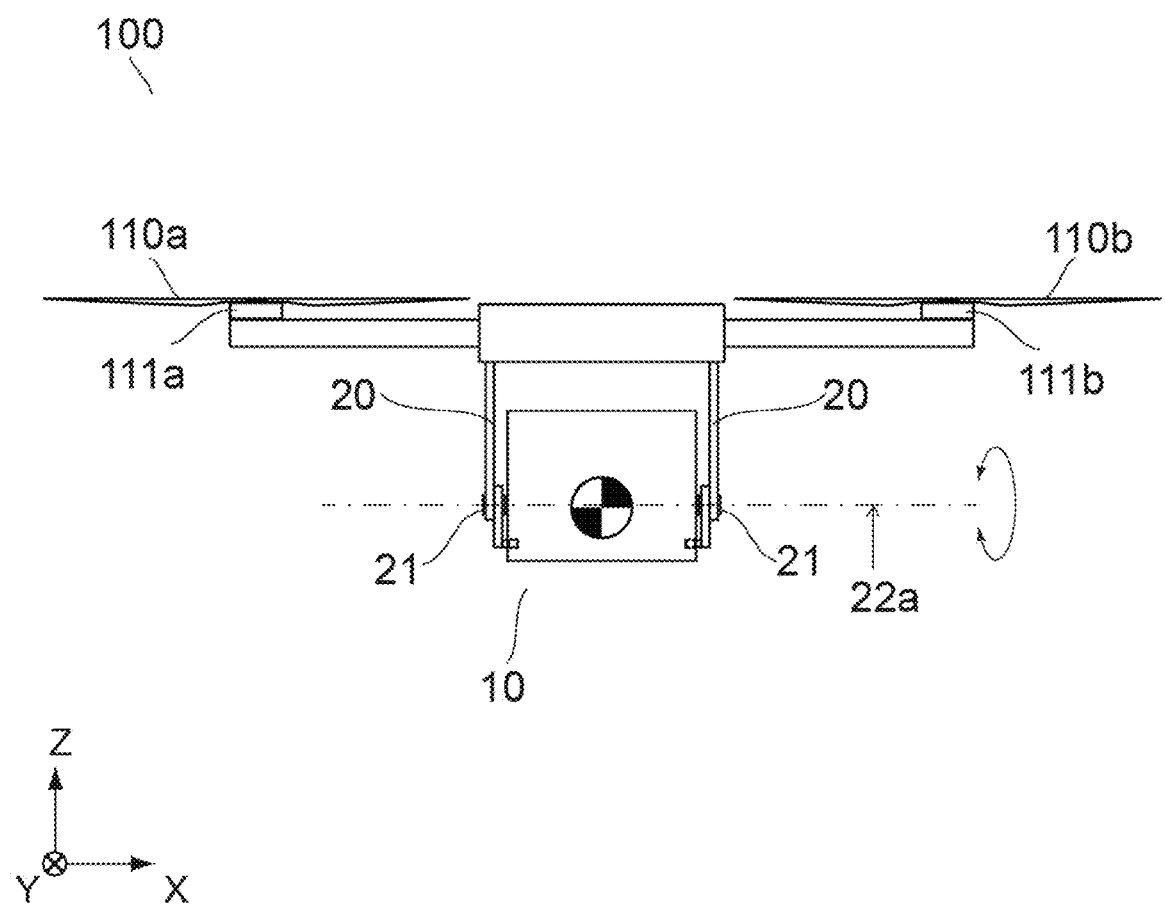
FIG. 6 is another front view of the flight vehicle 100 according to the present invention.

Therefore, the transport unit 10 in the flight vehicle 100 of the present embodiment includes a holding mechanism 20 including a rotation unit 21. As shown in FIGS. 3 and 4, the rotation unit 21 rotates in the pitch direction along the rotation shaft 22a in order to reduce the influence of the tilting of the flight vehicle 100 on the transport unit 10 during forward movement.

The rotatable angle of the rotation unit 21 may be changed depending on the flight method of the flight vehicle 100. For example, the rotatable angle may change depending on the inclination at the time of forward movement, or the rotatable angle may change so as to be widened in the +Y direction when the backward movement is made possible.

However, when the holding mechanism 20 is provided with a servo or the like, the servo or the like becomes large and the weight can be increased by widening the rotatable angle. When the holding position of the transport unit 10 is high (close to the flight vehicle 100), it is necessary to consider the movable space so that the transport unit 10 does not collide even if the flight vehicle 100 is tilted. When backward movement is made possible, it can also rotate in the +Y direction as described above, and thus, there arises the necessity for providing the movable space in the rear as well. Therefore, by limiting the rotation angle (further, limiting the traveling direction during transportation), it does not have an unnecessary rotation range, and it is possible to reduce the weight of the holding mechanism 20 and reduce the restrictions on the shape of the flight vehicle 100.

In case where the transport unit 10 is a substantially rectangular parallelepiped, if the vertical sides facing each other are maintained by one point as described above, the holding mechanism and the connection member may be more complicated than when the side surfaces facing each other are maintained by one point. However, since the corner part of the transport unit 10 are maintained so as to be directed forward, the air resistance during forward movement of the flight vehicle can be reduced, and an increase in flight efficiency can be expected.

Figure 12:
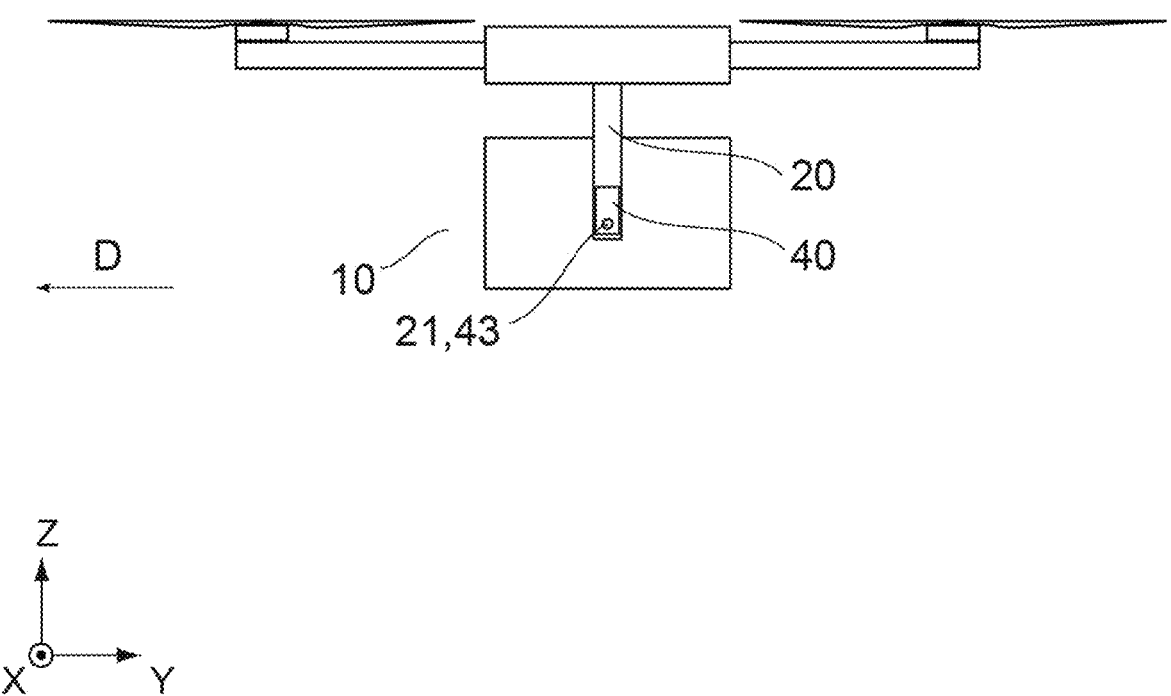
FIG. 12 is a side view when a servo is provided as a holding mechanism for the flight vehicle 100 according to the present invention.
Figure 13:
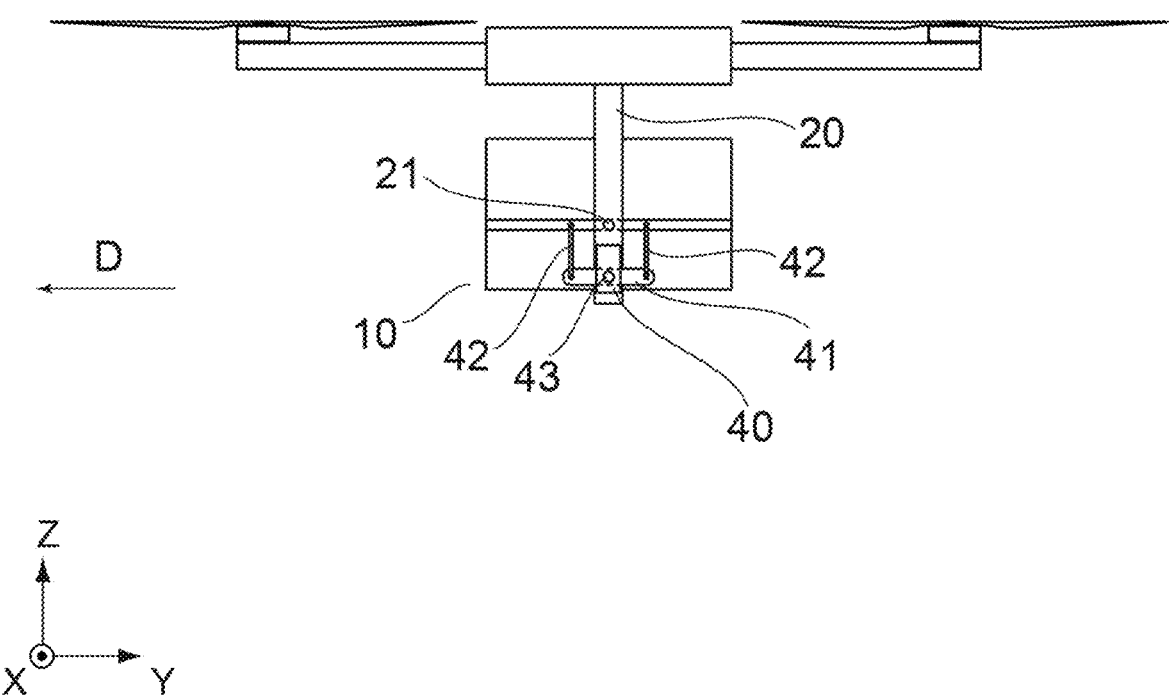
FIG. 13 is another side view when a servo is provided as a holding mechanism for the flying object 100 according to the present invention.

The transport unit 10 can be controlled so as to be maintained at a predetermined posture (for example, substantially horizontal) in the pitch direction by an active control means such as a servo or a gimbal motor included in the holding mechanism 20. More specifically, for example, the servo 40 may be provided as shown in FIG. 12, and the servo rotation shaft 43 of the servo 40 may be arranged so as to become the rotation unit 21, and not only the servo 40 but also a servo horn 41 and a rod 42 may be provided as shown in FIG. 13. Further, in addition to the configuration illustrated in FIG. 13, it is more preferable to provide a damper on the rod 42.

The object to be transported 11 gathers at the bottom part of the transport unit 10 in response to gravity unless special processing is performed. Further, when the position of the object to be transported 11 is deflected in the X direction, the Y direction, and the XY directions in a top view of the transport unit 10, the center of gravity of the transport unit 10 is also deflected in the XY direction. Since the deflection of the center of gravity of the transport unit 10 leads to a load on the control means for maintaining the predetermined posture, it is preferable that the object to be transported 11 is mounted so as to concentrate on the center in the XY direction.

When a servo or gimbal motor is used as the control means, there is a risk that the servo may be get out of step due to the overload caused by the deflection of the center of gravity of the transport unit 10 so that normal control may not be possible, or the operating range of the gimbal motor may be exceeded and control may not be possible. In addition, even if it does not fall into an uncontrollable state, it can increase the energy used by the control means, reduce the efficiency, or cause premature wear and tear of the control means.

In order to operate the control means safely and efficiently, it is desirable that the rotation shaft 22a of the rotation unit 21 included in the holding mechanism 20 is brought close to the center of gravity of the transport unit 10. Further, when the position of the rotation shaft 22a and the center of gravity of the mounting unit are substantially matched as shown in FIGS. 1 to 3, the load on the control means is most reduced.

Here, as described above, the object to be transported 11 gathers at the bottom part of the transport unit 10 in response to gravity unless special processing is performed. Therefore, in many cases, the center of gravity of the transport unit 10 is presumed to be below the center when the transport unit 10 is viewed from the side. That is, the rotation shaft 22a of the rotation unit 21 is preferably located below the center in the side view of the transport unit 10.

In practice, since it is complicated to always match the position of the rotation shaft 22a with the center of gravity of the transport unit 10, the rotation shaft 22a of the rotation unit 21 is provided in advance at a position below the center in the side view of the transportation unit 10 as shown in FIGS. 1 to 3 and the like, so that in a general transport unit 10, the rotation shaft 22a can be brought close to the center of gravity of the transport unit 10.

Since the rotation shaft 22a approaches the center of gravity of the transport unit 10, the load on the control means is reduced. And it is possible to prevent the control from becoming uncontrollable and to suppress the energy used by the control means, as compared with the case where it is connected at the conventional position.

Figure 14:
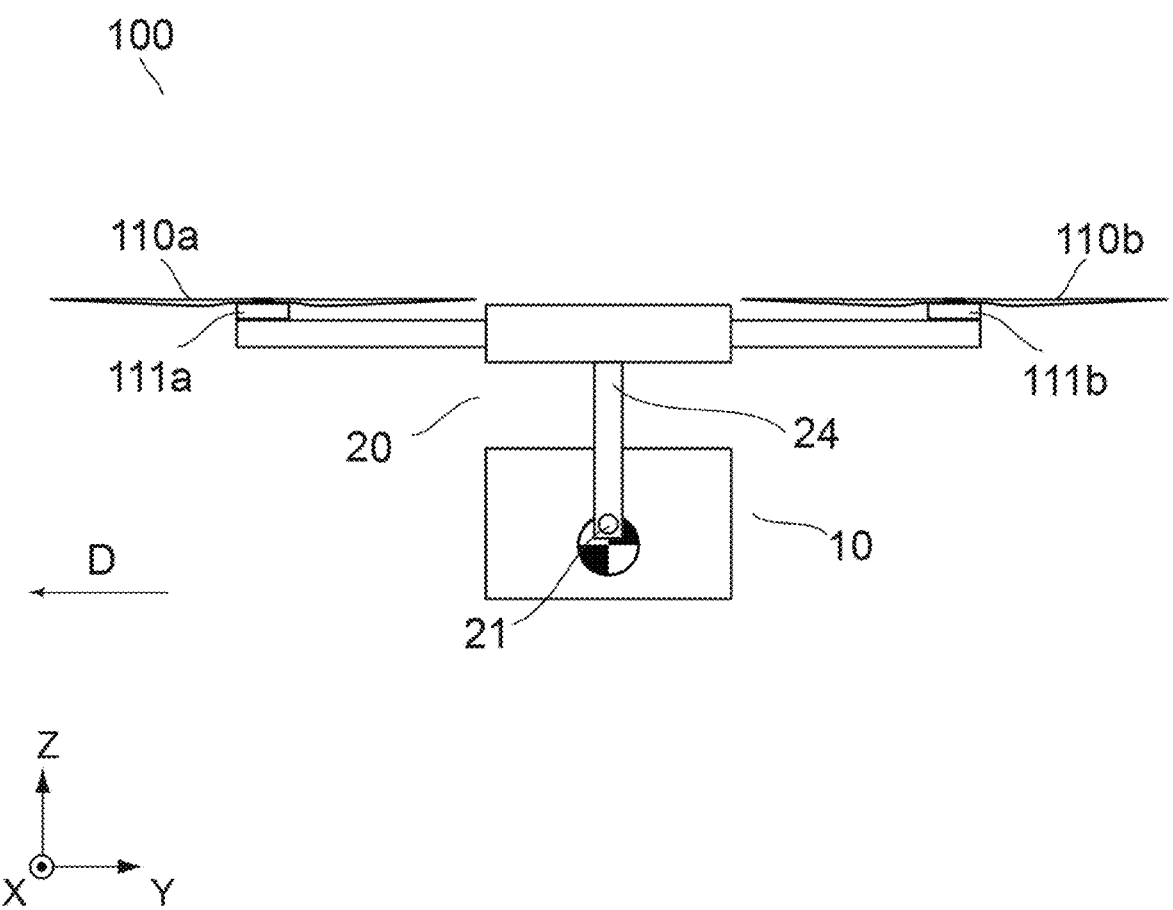
FIG. 14 is another conceptual diagram of the flight vehicle 100 according to the present invention as viewed from the side.
Figure 15:
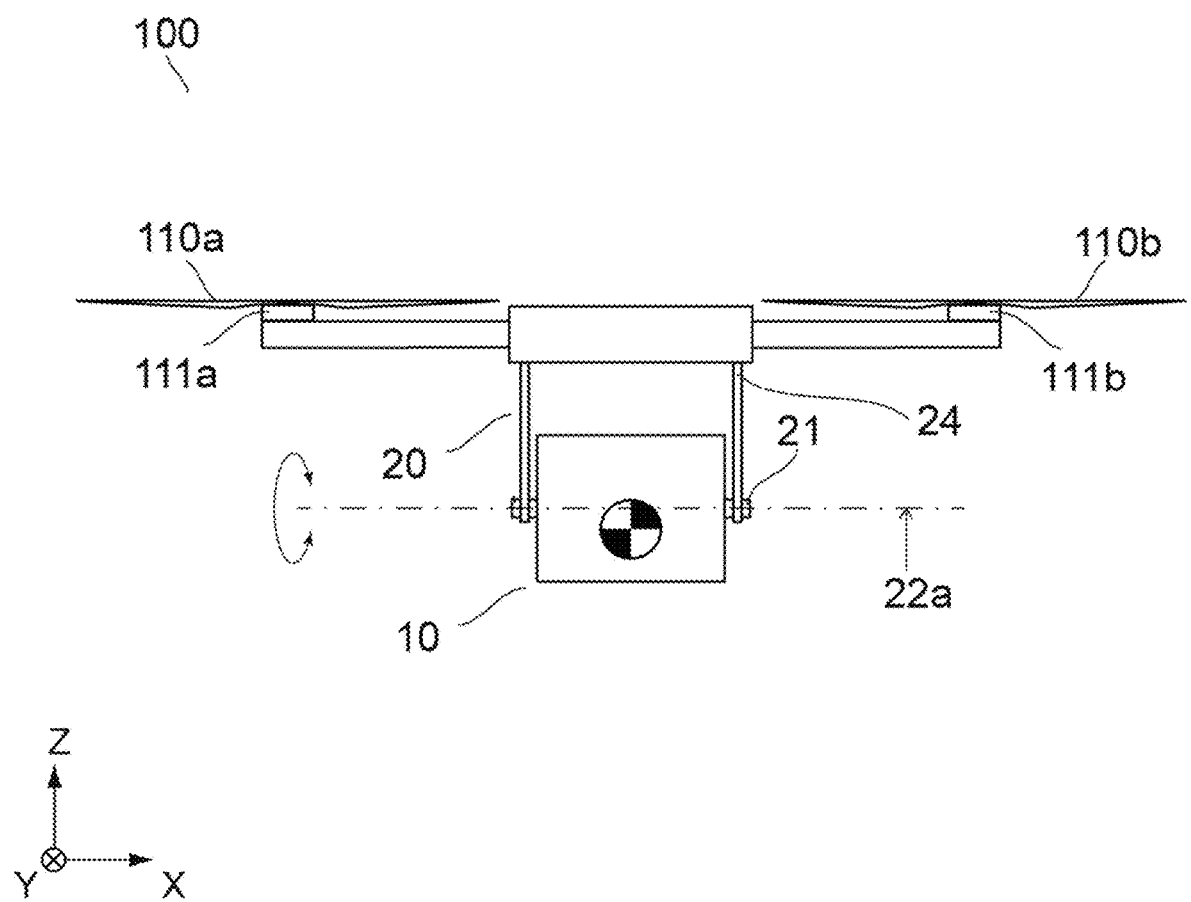
FIG. 15 is a front view of the flight vehicle 100 of FIG. 12.

Further, in the case of a passive control in which the holding mechanism 20 does not have a servo, a gimbal motor, or the like in order to control the posture of the transport unit 10, the holding mechanism 20 is further simplified, and the cost and defective rate can be reduced. More specifically, for example, as shown in FIGS. 14 and 15, the holding mechanism 20 includes an arm unit 24 connected to the flight vehicle 100, a rotation unit 21 that allows the transport unit 10 to swing independently of the inclination of the flight vehicle 100, and a holding configuration provided on the arm unit to hold the transport unit 10 (specific examples are omitted in the figures because they are described above). The flight vehicle 100 and the arm unit 24 are fixed to each other by screwing or welding so as not to be unintentionally separated during operation. Further, it may be integrally molded with a frame to which a propeller for propelling the airframe, a motor, or the like is connected.

It is desirable that the arm unit 24 has a strength that can withstand the load of the transport unit 10 and is lightweight. For example, it is possible to select and use a plate or pipe made of resin, metal, FRP or the like.

Here, when the holding mechanism 20 has a simple and low-cost configuration, the holding positions of the rotation unit 21 and the transport unit 10 are made to match in the holding configuration. A hole for passing a shaft is provided in each of the arm unit 24 and the transport unit 10, and rotation is made possible by the rotation shaft 22a by passing the shaft part such as a screw or a shaft. Further, when the arm unit 24 is provided with a substantially columnar protrusion serving as a shaft part in advance, rotation is also possible by providing a hole through which the shaft part passes only in the transport unit 10. The same operation can be performed by reversing the relationship between the arm unit 24 and the transport unit 10, providing a protrusion in the transport unit 10, and providing a hole part in the arm unit 24.

More preferably, by providing the bearing part inside the above-mentioned hole part, it can rotate more accurately and smoothly. The ball bearing, oilless bushing, sleeve bearing, etc. are generally used for the bearing part, but it should be selected according to the application and environment, and are not limited thereto. Further, a metal or resin screw or shaft can be used for the shaft part to be inserted into the hole part.

Figure 7:
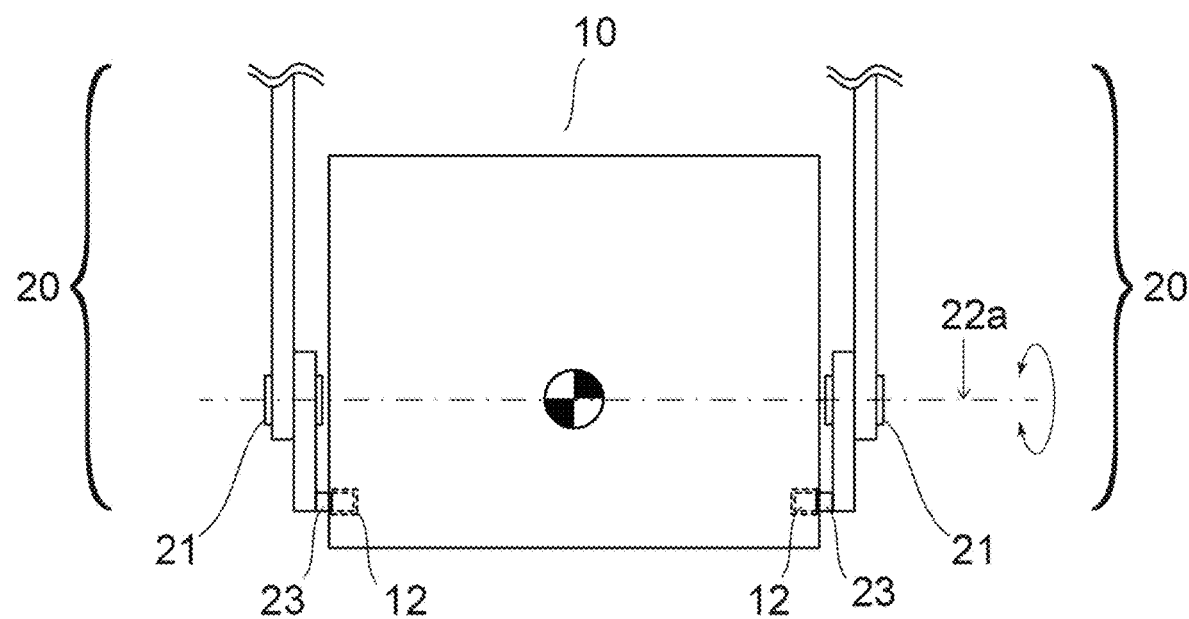
FIG. 7 is a diagram when a holding mechanism of the flight vehicle 100 of FIG. 6 holds a transport unit.
Figure 7:
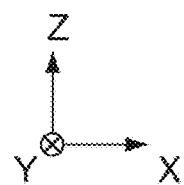
Figure 8:
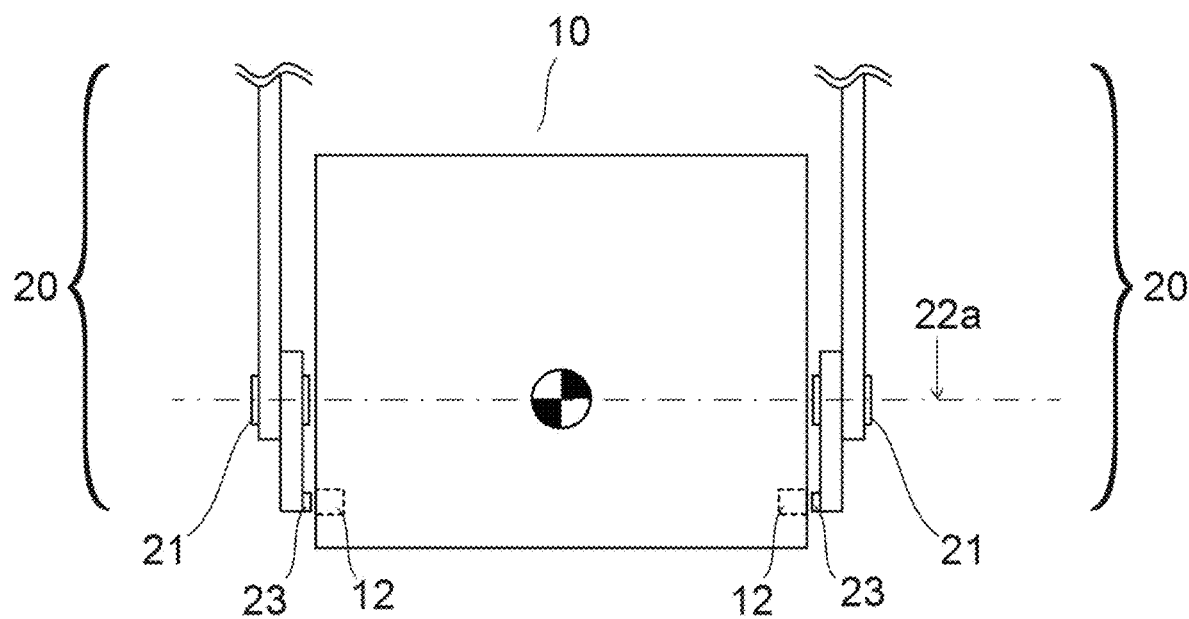
FIG. 8 is a diagram when the holding mechanism of FIG. 7 does not hold the holding of the transport unit.
Figure 9:
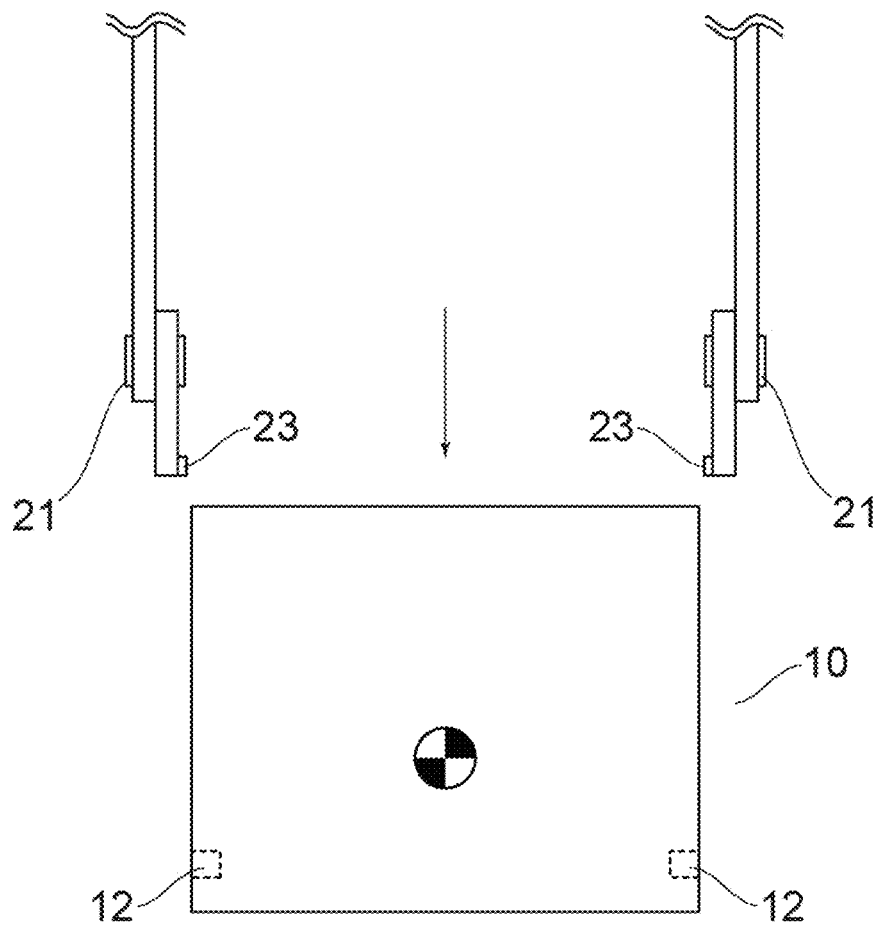
FIG. 9 is a diagram when the transport unit is separated from the holding mechanism of FIG. 7.

When the rotation unit 21 and the holding position are provided at different positions, for example, as shown in FIG. 7, the holding mechanism 20 for holding the transport unit 10 via a connection member having a hole or the like eliminates the necessity for providing a hole or the like for rotation in the transport unit 10. For example, when the delivery product itself such as a cardboard box serves as the transport unit 10, since rotation is possible without opening a hole in the box, the holding configuration of the holding mechanism 20 is a structure that does not need to make a hole, whereby the delivered product is not damaged, and so it is suitable from the viewpoint of waterproof and dustproof, or from the viewpoint of maintaining the quality of the corrugated board box.

In this manner, when using the holding mechanism 20 that does not have a servo, gimbal motor, or the like, the transport unit 10 rotates in the pitch direction using its own weight and maintains the posture of the transport unit 10 itself. Therefore, as shown in FIGS. 14 and 15, it is preferable to provide the rotation shaft 22a of the rotation unit 21 included in the holding mechanism 20 above the center of gravity of the transport unit 10.

Further, as described above, the object to be transported 11 gathers at the bottom of the transport unit 10 in response to gravity unless special processing is performed. Therefore, it is presumed that the center of gravity of the transport unit 10 is below the center when the transport unit 10 is viewed from the side.

Practically, it is complicated to always make the vertical deviation between the position of the rotation shaft 22a and the center of gravity of the transport unit 10 identical, and it is not realistic to change the amount of deviation in consideration of the stability of the posture due to the change in the weight of the transport unit 10. Therefore, by providing the rotation shaft 22a of the rotation unit 21 in advance at the center or a position above the center in the side view of the transport unit 10, so that with a general transport object 11, the rotation shaft 22a can be provided above the center of gravity of the transport unit 10.

In this manner, when only one axis is rotated, it is possible to effectively cancel the tilt at the time of forward movement with a simple mechanism. In particular, it is efficient to cancel the tilt in the direction with the highest usage rate for forward-specialized aircraft such as transport flight vehicle whose main task is delivery of luggage. If the number of axes of rotation is increased, the number of tilting directions that can be handled increases, but instead, the mechanism increases and becomes more complicated, and the weight, production cost, maintenance cost, defective rate, etc. increase. This point is particularly remarkable when the rotation unit 21 is configured so as to electrically actively maintain a predetermined posture such as horizontal by a control means such as a servo or a gimbal motor.

Also, in the case of rotating only one axis, when the flight vehicle 100 is banked for turning and changing its direction, as illustrated in FIG. 16A, the centrifugal force acting downward of the flight vehicle 100 is large. A force that presses the object to be transported 11 toward the bottom surface of the transport unit 10 acts to stabilize the object 11. However, when the number of axes of rotation in the roll direction is increased to two axes and the holding mechanism 20, which is actively controlled by a servo or gimbal motor, etc., is provided, as illustrated in FIG. 16B, in order to maintain the transport unit 10 horizontally by the roll axis control, because the centrifugal force acting sideways on the object to be transported 11 becomes large, it is not stable. An object in the object to be transported 11 may be displaced and its position may be deflected, or liquid or the like may easily flow out of the container. Therefore, if turning or changing its direction occurs, active control on the pitch axis and the roll axis depending on the object to be transported 11 may not be very preferable.

Figure 17:
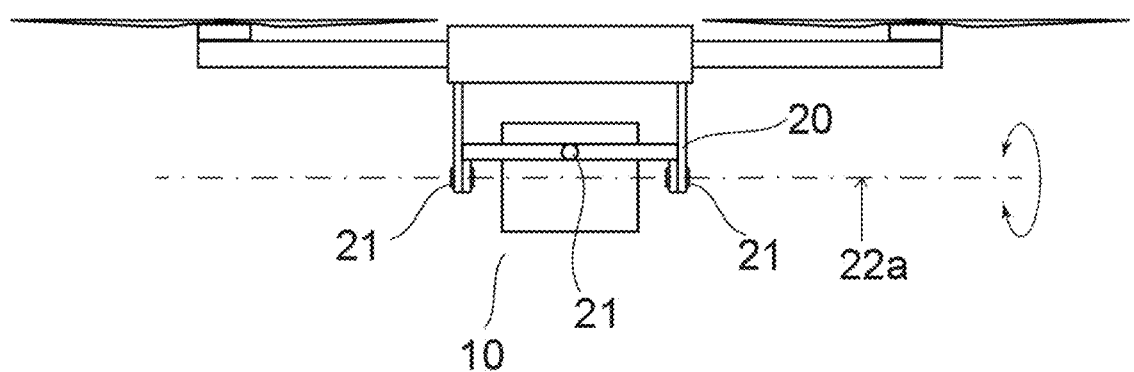
FIG. 17 is a conceptual diagram of a flight vehicle 100 according to the present invention, which is provided with two rotation axes and is viewed from the front.
Figure 17:
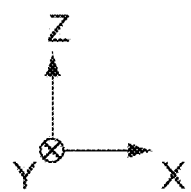
Figure 18:
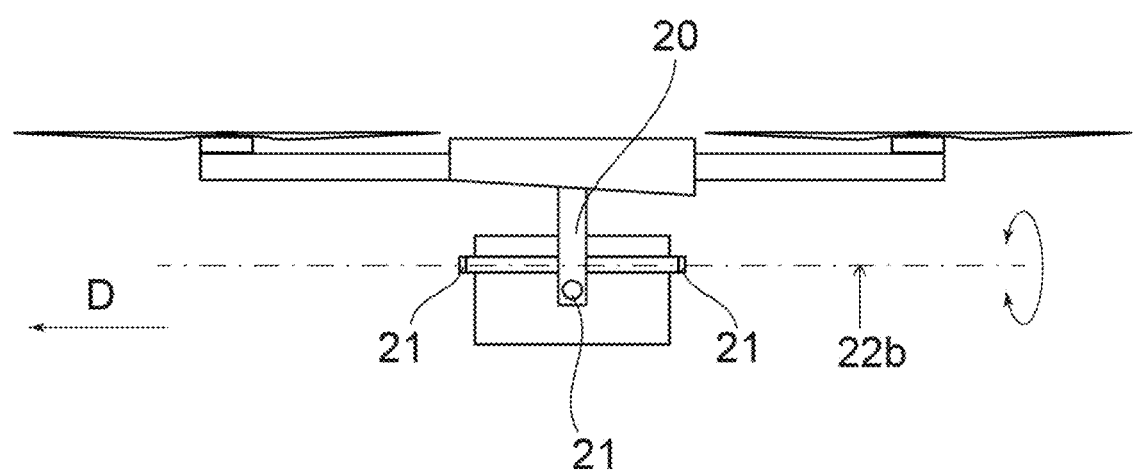
FIG. 18 is a side view of the flight vehicle 100 of FIG. 14.
Figure 18:
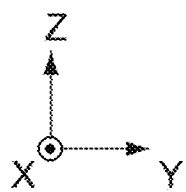

On the other hand, in a flight vehicle provided with a holding mechanism 20 that is passively controlled without a servo or a gimbal motor, more stable transportation of the transport unit 10 becomes possible by further providing a rotation shaft 22b in the roll direction as shown in FIGS. 17 and 18. That is, in the case of passive control, the transport unit 10 also rotates with the centrifugal force, so that the stability of FIG. 16A becomes more remarkable. Further, the center of gravity of the transport unit 10 shifts in the X direction depending on the arrangement of the transport object 11 mounted therein. By providing the rotation shaft 22b in the roll direction, the deviation of the center of gravity in the X direction can be canceled. Even if the object to be transported 11 is not strictly arranged, it becomes a configuration that does not have a great influence on the flight.

Therefore, when the holding mechanism 20 has a control means for controlling the posture of the transport unit 10 and the rotation shaft 22 has two axes, i.e., the pitch rotation shaft 22a and the roll rotation shaft 22b, it is desirable that the holding mechanism does not have an active control means and is a passive control means.

Further, as illustrated in FIG. 18, in order to prevent the airframe from contacting the transport unit 10 when the airframe of the flight vehicle 100 tilts forward in the pitch direction during forward movement, the front shape of the flight vehicle is made different from the rear shape of the flight vehicle (for example, the thickness of the front of the airframe is made thinner than the thickness of the back of the airframe), so that a movable area of the transport unit can be provided. This is effective even when the pitch rotation shaft 22a is uniaxial.

Further, the pitch rotation shaft 22a and the roll rotation shaft 22b may intersect like a gimbal structure, but they do not necessarily have to intersect. That is, by separately setting the positions with respect to the transport unit 10 for the pitch rotation shaft 22a and the roll rotation shaft 22b, respectively, the characteristics of the behavior of the pitch rotation shaft 22a and the behavior of the roll rotation shaft 22b can be changed.

For example, it is assumed that the transport unit 10 swings due to a sudden stop or sudden start with respect to the pitch rotation shaft 22a, and the mounting unit swings due to turning or direction change with respect to the roll rotation shaft 22b. In these two types of movements, the movement with respect to the pitch rotation shaft 22a is stronger than the movement with respect to the roll rotation shaft 22b on a general flight path. In other words, when setting a flight route, it is possible to set a route that does not require direction change due to a sharp curve, and it is possible to make the force relatively weak with respect to the roll rotation shaft 22b, but practically, the possibility of a sudden stop is possible regardless of the route setting. Therefore, it is necessary to assume that the strength of the movement with respect to the pitch rotation shaft 22a is stronger than the movement with respect to the roll rotation shaft 22b.

Therefore, the rotation shaft 22a in the pitch direction is provided at a position closer to the center of gravity of the transport unit 10 than the rotation shaft 22b in the roll direction (however, if it coincides with the center of gravity, it may rotate around the rotation shaft 22a, etc. for a while, so it should be provided at least at the position above the center of gravity), whereby even when a strong force is applied due to a sudden stop or the like, it is difficult to sway and the transport unit 10 will not make a full turn.

Figure 19:
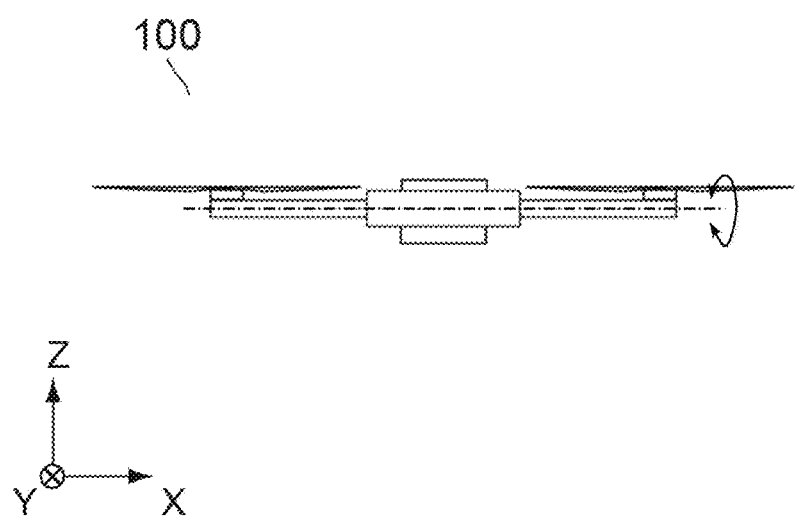
FIG. 19 is another conceptual diagram of the flight vehicle 100 according to the present invention, in which a flight vehicle having biaxial rotation axes is viewed from the front.

On the other hand, by providing the rotation shaft 22b of the roll shaft above the transport unit 10, the rotation range above the transport portion 10 is reduced. Therefore, it is possible to reduce the movable area of the transport unit provided in the airframe, and it is possible to reduce the restrictions on the airframe design. This is particularly noticeable when the transport unit 10 is provided to have a portion covered by the airframe, for example, as shown in FIG. 19. That is, parts and the like that control the airframe 100 are often arranged on the upper surface of the airframe. On the other hand, since there are few restrictions on the underside of the airframe, there is plenty of space, so it is unlikely to be a problem.

<Configuration of Flight Vehicle 100>

The configuration of the flight vehicle 100 illustrated so far will be illustrated. It is desirable that the flight vehicle 100 includes at least elements such as a propeller 110 and a motor 111 for performing flight and is mounted with energy for operating them (for example, secondary battery, fuel cell, fossil fuel, etc.).

Further, the flight vehicle 100 shown in the figure is drawn in a simplified manner for facilitating the explanation of the structure of the present disclosure, and for example, the detailed configuration of the control unit and the like is not shown.

The flight vehicle 100 and the moving body 200 described later may make the direction of the arrow D in the figure (−Y direction) as a traveling direction.

Further, in the following explanation, the terms may be selectively used according to the following definitions.

front-rear direction: +Y direction and −Y direction, up-down direction (or vertical direction): +Z direction and −Z direction, left-right direction (or horizontal direction): +X direction and −X direction, travelling direction (forward): −Y direction, reverse direction (backward): +Y direction, ascending direction (upward): +Z direction, descending direction (downward): −Z direction.

The propellers 110a and 110b receive output from a motor 111 to rotate. The rotation of the propellers 110a and 110b generates a propulsive force for taking off the flight vehicle 100 from the starting point, moving and landing it at a destination. Further, the propellers 110a and 110b can rotate rightward, stop, and rotate leftward.

The propeller 110 included in the flight vehicle of the present invention has one or more blades. Any number of blades (rotors) (e.g. 1, 2, 3, 4, or more blades) can be used. Further, the shape of the blade can be any shape such as a flat shape, a curved shape, a twisted shape, a tapered shape, or a combination thereof. Further, the shape of the blade can be changeable (for example, expansion/contraction, folding, bending, etc.). The blades may be symmetrical (having the same upper and lower surfaces) or asymmetric (having different shaped upper and lower surfaces). The blades can be formed into an airfoil, a wing, or geometry suitable for generating dynamic aerodynamic forces (e.g., lift, thrust) when the blades move through the air. The geometry of the blades can be appropriately selected to optimize the dynamic air characteristics of the blades, such as increasing lift and thrust and reducing drag.

Further, the propeller included in the flight vehicle of the present invention may be fixed pitch, a variable pitch, or a mixture of a fixed pitch and a variable pitch, without being limited thereto.

The motor 111 causes the rotation of the propeller 110, and for example, the drive unit can include an electric motor, an engine, or the like. The blades can be driven by the motor and rotate around the rotary shaft of the motor (e.g., the major axis of the motor).

The blades can all rotate in the same direction or can rotate independently. Some of the blades rotate in one direction and the other blades rotate in the other direction. The blades can all rotate at the same rotation speed or can rotate at different rotation speeds. The rotation speed can be automatically or manually determined based on the dimensions (e.g., size, weight) and control state (speed, moving direction, etc.) of the moving body.

The flight vehicle 100 determines the rotation speed of each motor, or the flight angle in response to the wind speed and the wind direction by a flight controller, a propo, or the like. Thereby, the flight vehicle can perform movements such as ascending, descending, accelerating, decelerating, and changing direction.

The vehicle 100 may perform autonomous flight according to a route or rule set in advance or during flight, or flight by manipulation using a propo.

Figure 20:
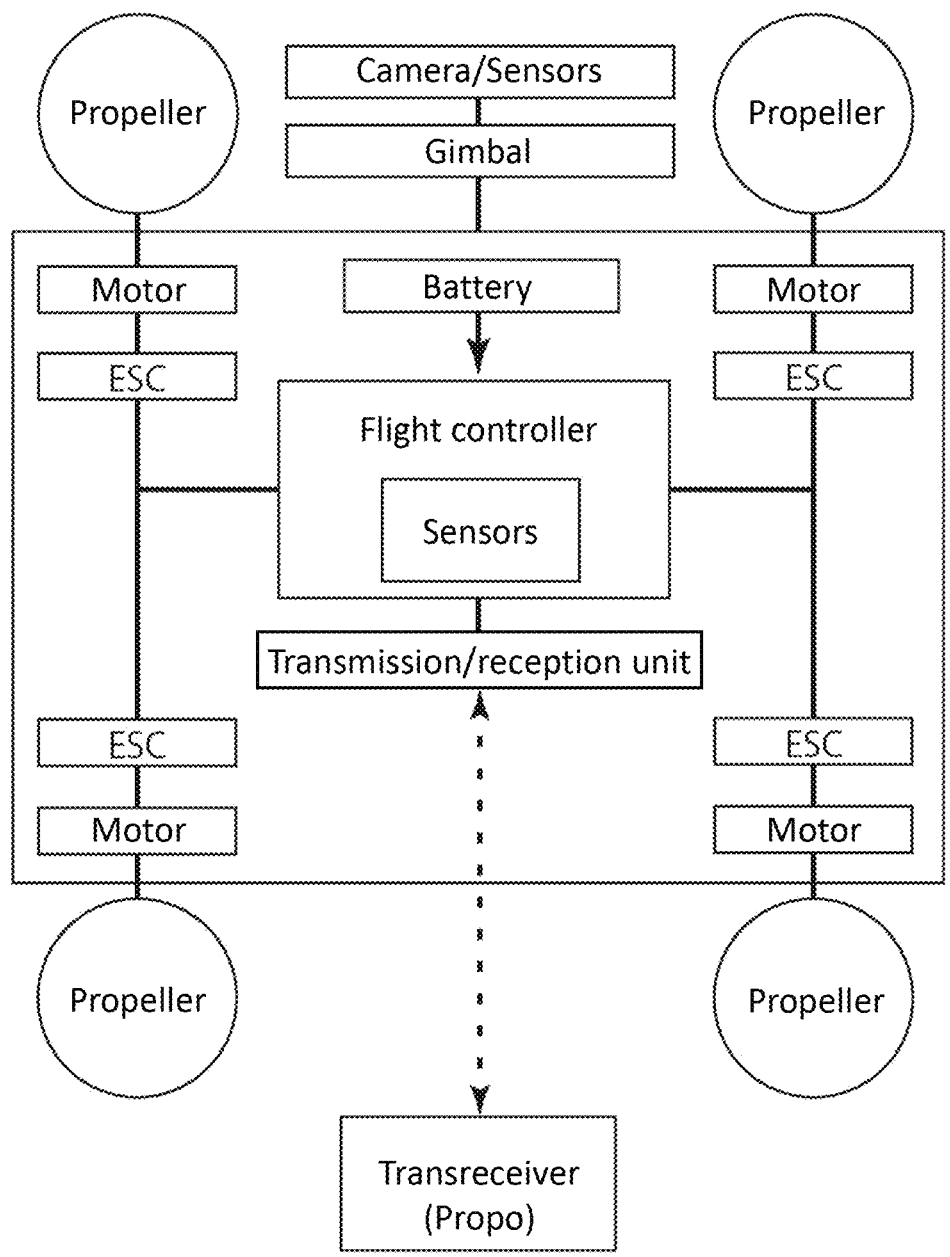
FIG. 20 is a functional block diagram of the flight vehicle 100.

The above-mentioned flight vehicle 100 has a functional block shown in FIG. 20. In addition, the functional block of FIG. 20 is a minimum reference structure. A flight controller is a so-called processing unit. The processing unit may have one or more processors, such as a programmable processor (e.g., a central processing unit (CPU)). The processing unit has a memory that is not shown, and it is possible to access the memory. The memory stores logic, codes, and/or program instructions that can be executed by the processing unit for performing one or more steps. The memory may include, for example, a separable medium such as an SD card or random access memory (RAM) or an external storage device. Data obtained from cameras and sensors may be transmitted directly to the memory and stored. For example, still image·dynamic image data taken by a camera, or the like is recorded in a built-in memory or an external memory.

The processing unit includes a control module configured to control the state of the rotorcraft. For example, the control module may control a propulsion mechanism (such as a motor) in order to adjust the spatial arrangement, velocity, and/or acceleration of the rotorcraft having six degrees of freedom (translational motions x, y and z, and rotational motions θx, θy, and θz). The control module can control one or more of the states of a mounting unit and sensors.

The processing unit can communicate with a transmission/reception unit configured to transmit and/or receive data from one or more external devices (e.g., a terminal, display device, or other remote controller). The transceiver can use any suitable communication means such as wired or wireless communication. For example, the transmission/reception unit can use one or more of a local area network (LAN), a wide area network (WAN), infrared, wireless, WiFi, point-to-point (P2P) network, telecommunication network, cloud communication, and the like. The transmission/reception unit can transmit and/or receive one or more of, data acquired by sensors, process results generated by the processing unit, predetermined control data, user command from a terminal or a remote controller, and the like.

Sensors according to the present embodiment may include inertial sensors (acceleration sensors, gyro sensors), GPS sensors, proximity sensors (e.g., LiDAR), or vision/image sensors (e.g., cameras).

Details of Second Embodiment

In the details of the second embodiment according to the present invention, the components overlapping with the first embodiment perform the same operation, and thus, the description thereof will be omitted again. In the first embodiment, the flight vehicle 100 has been described as a moving body, but in the second embodiment, unlike the flight vehicle 100, another moving body (hereinafter, referred to as "moving body 200") that moves on land or on the water will be described. The flight vehicle 100 and the moving body 200 are collectively referred to as a "moving body".

Figure 21:
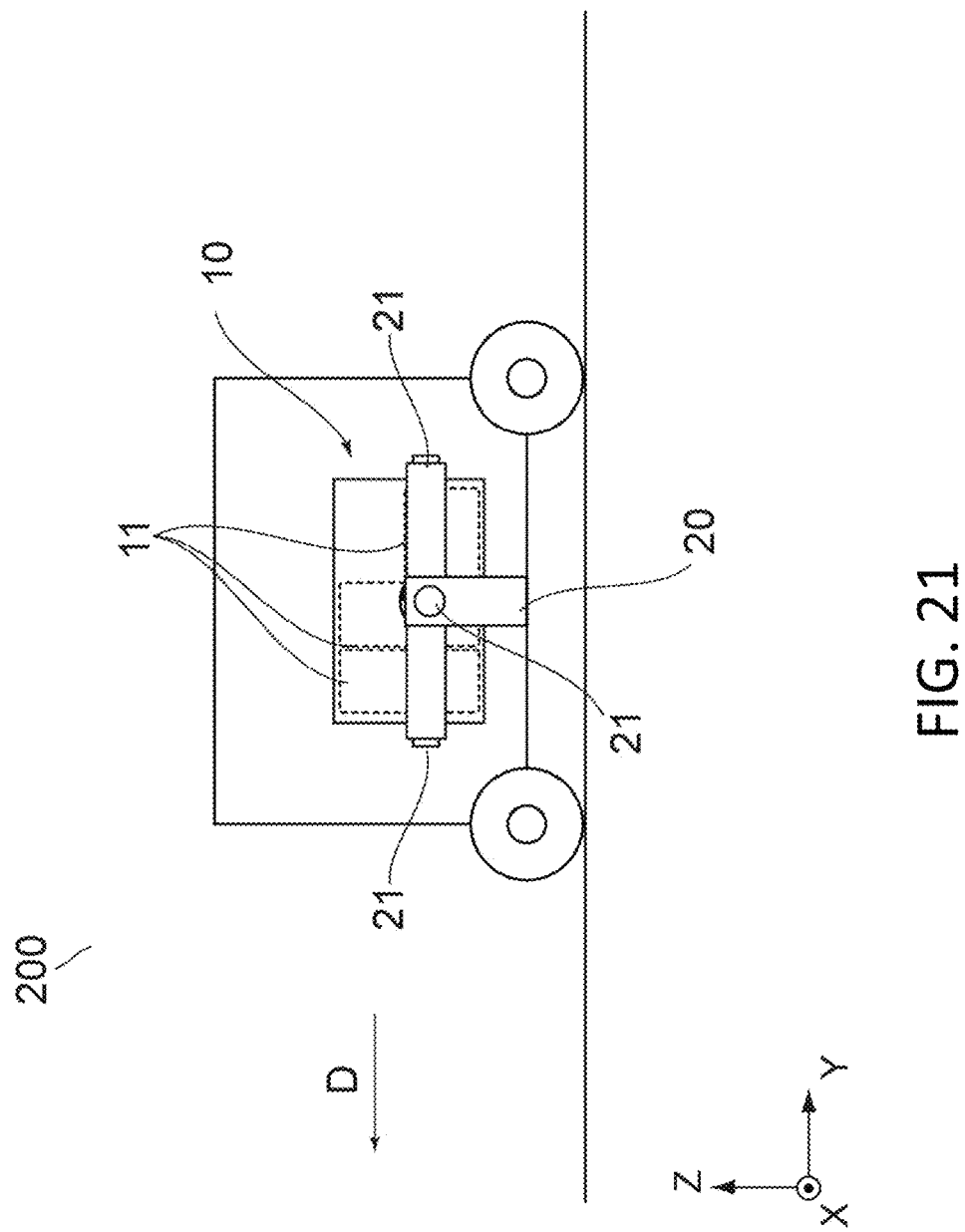
FIG. 21 is a conceptual diagram of a moving body 200 according to the present invention as viewed from the side.
Figure 22:
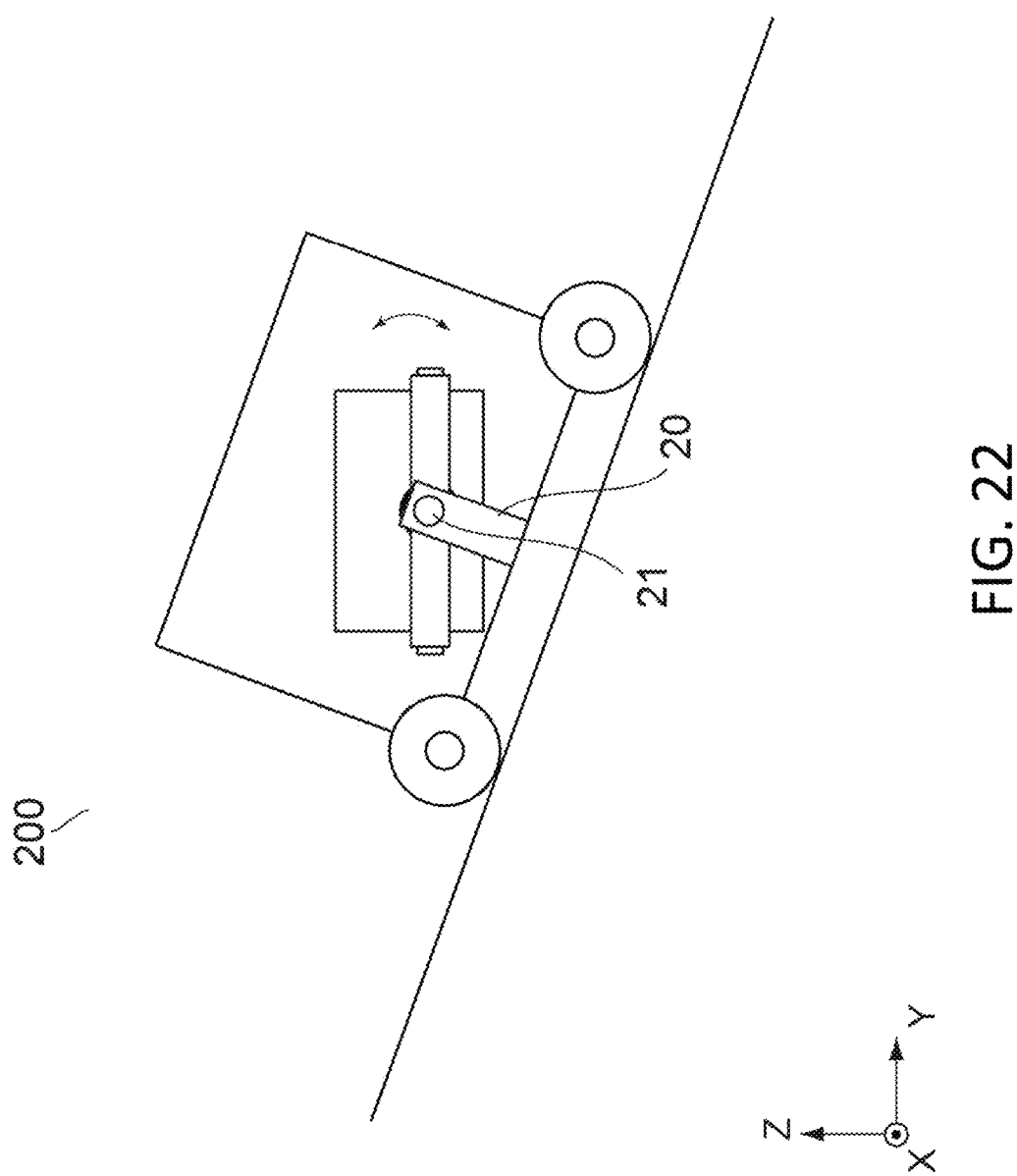
FIG. 22 is a front view when the moving body 200 of FIG. 21 is tilted in the pitch direction.
Figure 23:
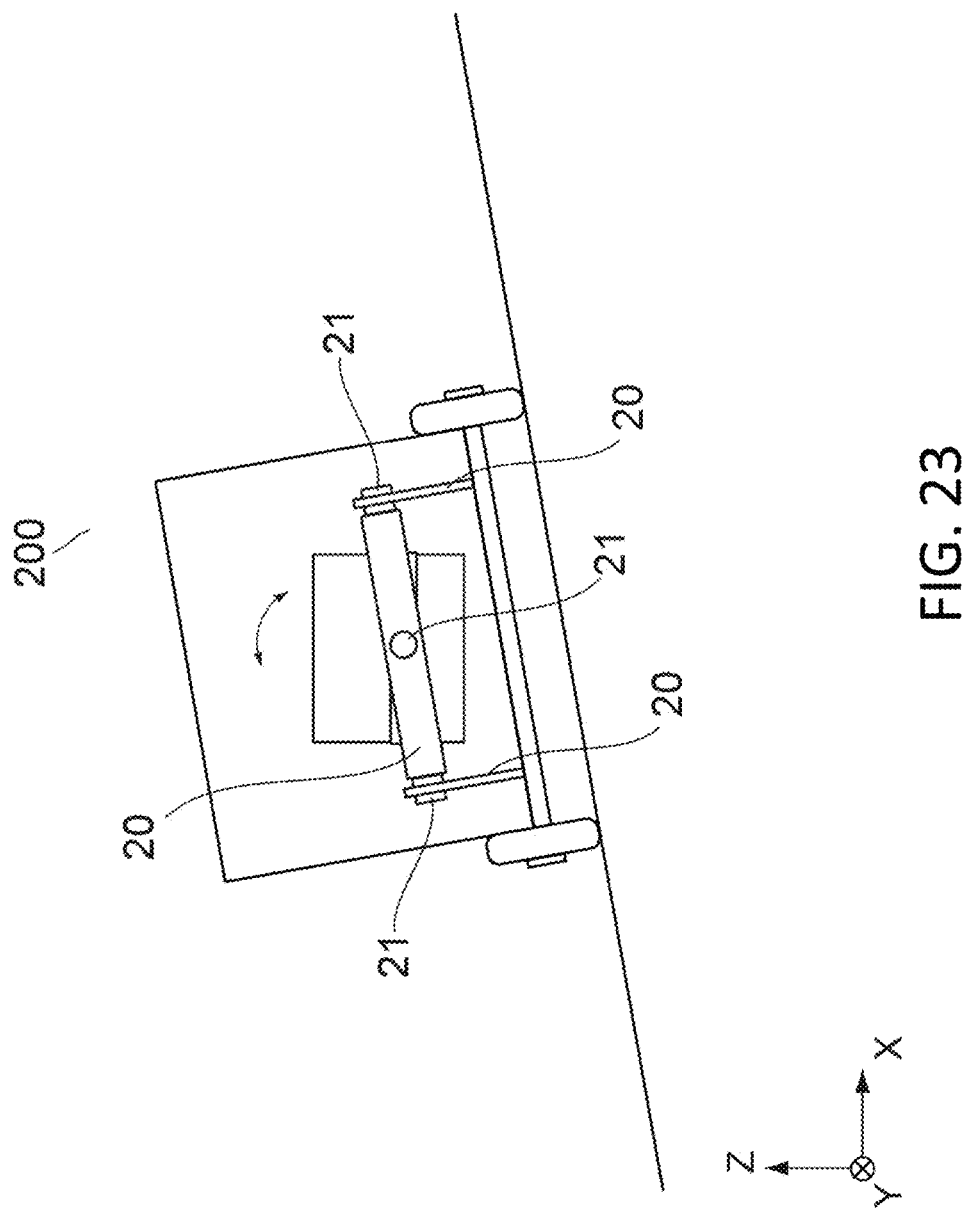
FIG. 23 is a front view when the moving body 200 of FIG. 21 is tilted in the roll direction.

As shown in FIGS. 21 to 23, the moving body 200 according to the embodiment of the present invention has mount the object to be transported 11 and has a function of enabling movement to a destination point. The configuration of the moving body 200 is not particularly limited, but for example, the movement of the moving body 200 can be one operated and controlled by a person, or may be one that can be autonomously moved, such as a well-known automatic traveling robot.

When mounted and operated on a robot traveling on land or on water, from the operating environment, it is desirable that the rotating unit included in the holding mechanism 20 has two or more rotation shafts. For example, as shown in FIGS. 22 and 23, when the moving body is tilted in the pitch direction and the roll direction due to the tilt of the traveling surface, it is solved by providing a rotation unit 21 having a rotation shaft in the pitch direction and the roll direction. These may be active control by, for example, a servo or a gimbal motor as shown in the first embodiment or may be passive control on the contrary.

Figure 24:
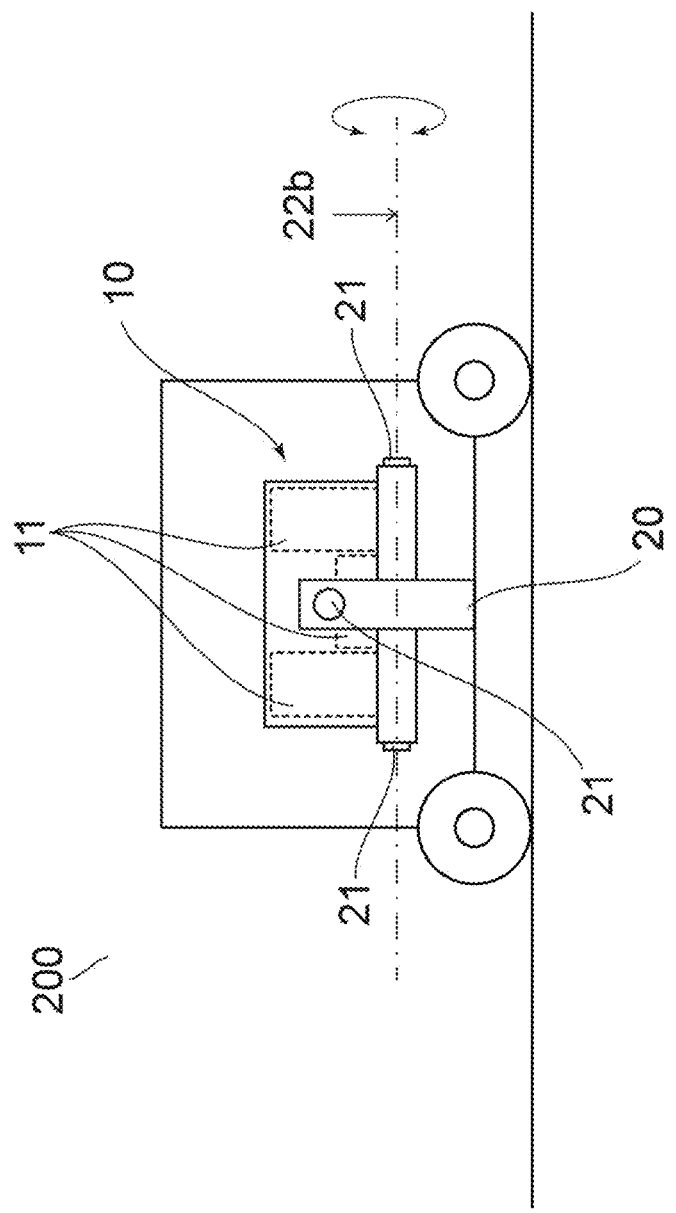
FIG. 24 is a conceptual diagram of a moving body 200 according to the present invention, which is provided with biaxial rotation axes and is viewed from the side.
Figure 25:
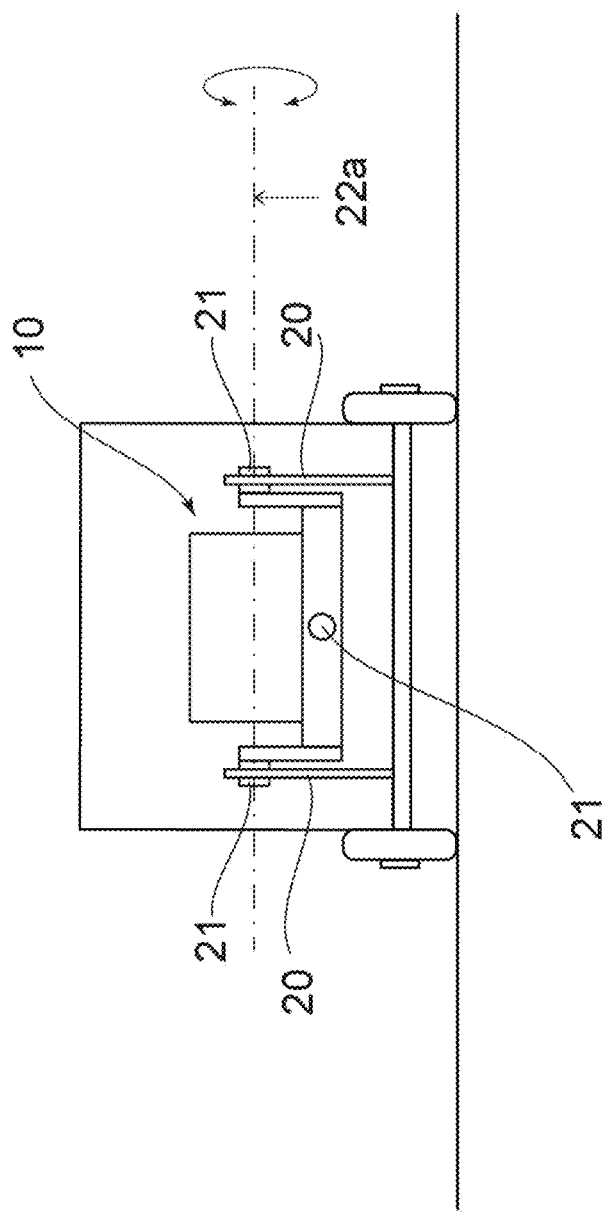
FIG. 25 is a front view of the moving body 200 of FIG. 24.
Figure 26:
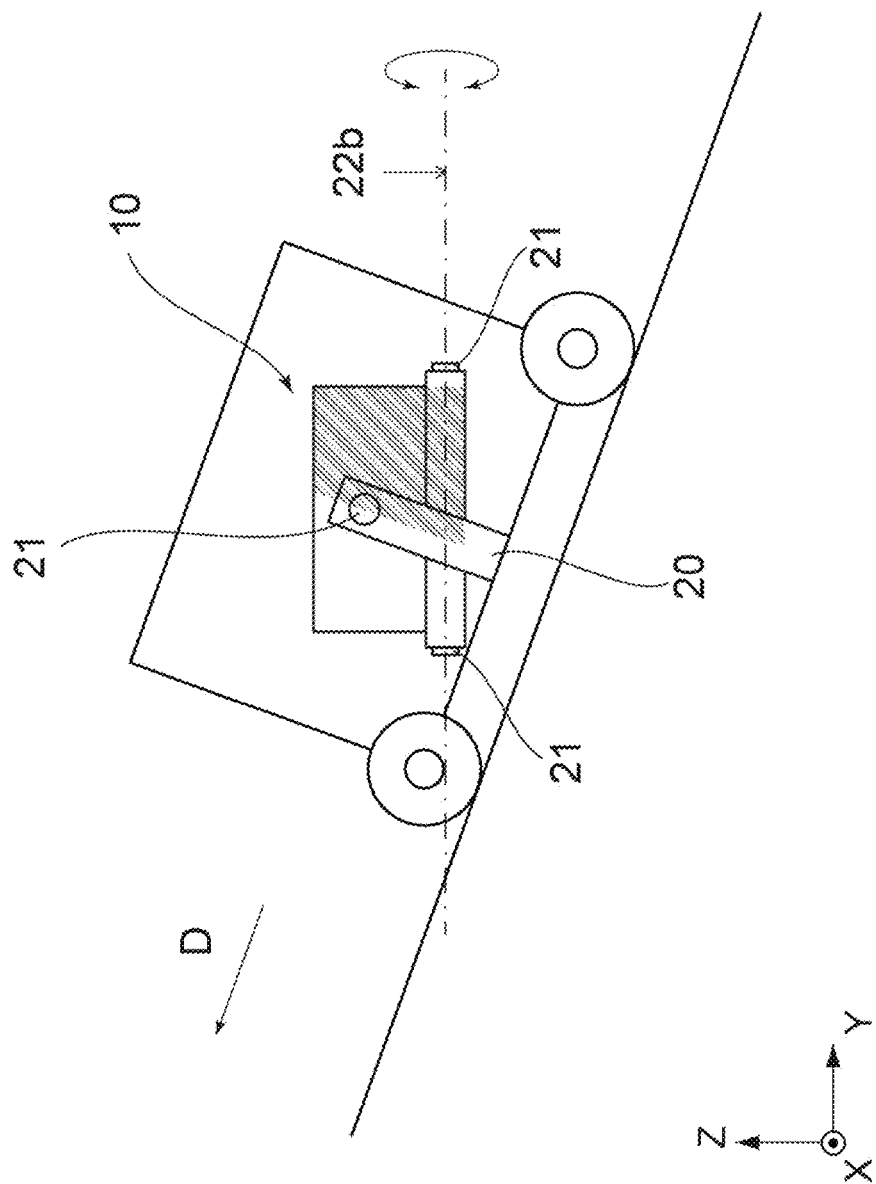
FIG. 26 is a side view showing the position of the mounting unit when the moving body 200 of FIG. 24 is tilted in the pitch direction.

In the holding mechanism 20 having two or more rotation shafts, it is not necessary for the rotation shafts to intersect at the center of gravity of the transport unit 10, and the shafts may be shifted up and down or left and right. For example, as shown in FIGS. 24 to 26, by shifting the position of the rotation unit 21 up and down, it is possible to give different characteristics to each rotating shaft.

Figure 27:
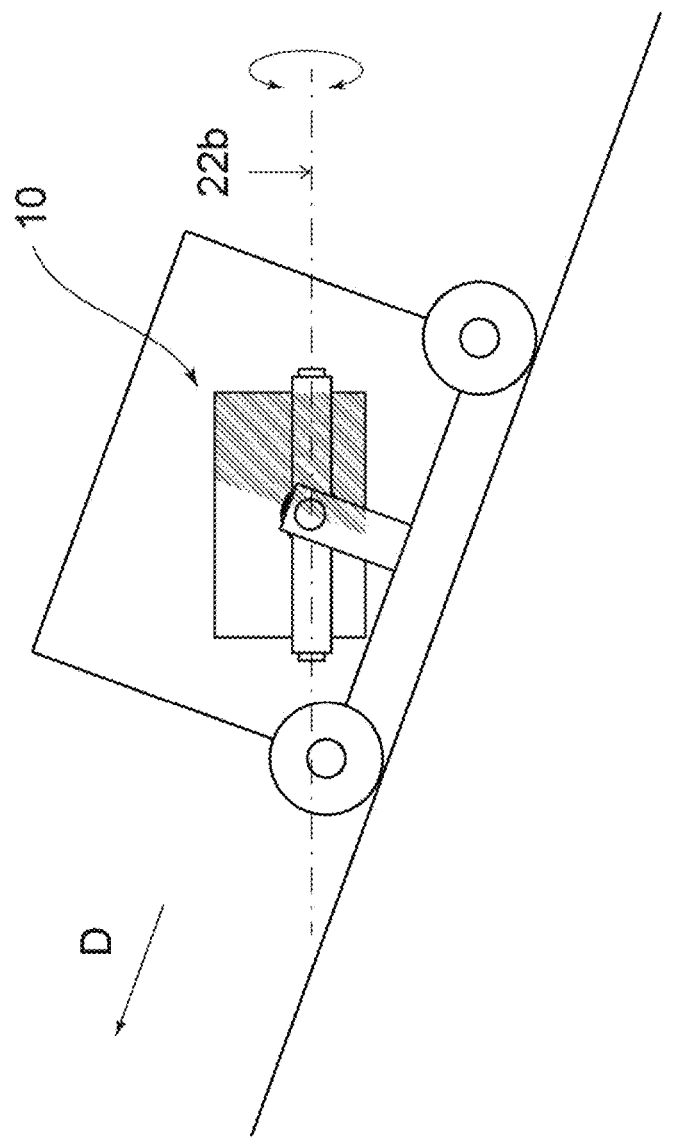
FIG. 27 is a side view showing the position of the mounting unit when the moving body 200 of FIG. 21 is tilted in the pitch direction.

For example, considering that the moving body 200 has a transport unit 10 (and an object to be transported 11) and climbs a slope, the position of the rotation unit 21 for the rotation shaft in the pitch direction may be above the transport unit 10. More specifically, when the moving body 200 climbs the slope, the moving body 200 is in a backward inclined posture. The transport unit 10 is located behind the moving body 200 while being kept horizontal by the holding mechanism 20. Compared to the moving body 200 shown in FIG. 27, the area of the transport unit 10 located behind the moving body 200 (illustrated in hatching in FIGS. 26 and 27) is increased in the moving body 200 shown in FIG. 26, in which the axis of rotation in the pitch direction is provided upward. By utilizing this action, for example, when climbing a slope in a rear-wheel drive moving body 200, it is possible to apply an appropriate load to the drive wheels. Further, although it is not limited thereto, since load transfer is more likely to occur than the conventional moving body 200, it is possible to perform a suitable operation by utilizing this.

Further, since the moving body 200 such as a vehicle or a ship has less influence on the moving efficiency due to the weight increase than the flight vehicle 100 that needs to stay in the air, it is easy to allow the increase in the mechanism.

The above-mentioned embodiments are merely examples for facilitating the understanding of the present invention and are not intended to limit the present invention. It goes without saying that modification and improvement can be made to the present invention without departing from the gist thereof, and the equivalents are included within the scope of the present invention.

DESCRIPTION OF REFERENCE NUMERALS

10 Transport unit
11: object to be transported
20: holding mechanism
100: flight vehicle
200: moving body

The invention claimed is:

1. A flight vehicle comprising a holding mechanism that has a rotation unit rotating about only a pitch axis, and that horizontally holds a transport unit, wherein the rotation shaft of the rotation unit is located at or above the center of the side of the transport unit to hold the transport unit, and
   the holding mechanism grips the transport unit via a passive mechanical connection selected from clamps, forks, or pins.

2. The flight vehicle according to claim 1, wherein the position of a rotation shaft of the rotation unit is located above a center of gravity of the transport unit.

3. The flight vehicle according to claim 1, wherein the holding mechanism horizontally holds the transport unit by active control.

4. The flight vehicle according to claim 1, wherein the holding mechanism horizontally holds the transport unit by passive control.

5. The flight vehicle according to claim 1, wherein the holding mechanism has a separation mechanism or a removal mechanism.

6. The flight vehicle according to claim 1, wherein the rotation unit is mechanically constrained to rotate solely about the pitch axis and lacks actuators for roll or yaw adjustment.

* * * * *